(12) United States Patent
Shew

(10) Patent No.: US 9,717,117 B2
(45) Date of Patent: Jul. 25, 2017

(54) LIGHTING SYSTEM AND METHOD OF DEFLECTION

(76) Inventor: Larry N. Shew, Highland, MI (US)

( * ) Notice: Subject to any disclaimer, the term of this patent is extended or adjusted under 35 U.S.C. 154(b) by 464 days.

(21) Appl. No.: 13/450,462

(22) Filed: Apr. 18, 2012

(65) Prior Publication Data

US 2013/0051008 A1  Feb. 28, 2013

Related U.S. Application Data

(63) Continuation-in-part of application No. 12/983,227, filed on Dec. 31, 2010, now Pat. No. 8,770,770, and a continuation-in-part of application No. 13/417,169, filed on Mar. 9, 2012, and a continuation-in-part of application No. 13/442,843, filed on Apr. 9, 2012.

(60) Provisional application No. 61/476,374, filed on Apr. 18, 2011, provisional application No. 61/335,132, filed on Dec. 31, 2009, provisional application No. 61/450,825, filed on Mar. 9, 2011, provisional application No. 61/473,769, filed on Apr. 9, 2011.

(51) Int. Cl.
| | |
|---|---|
| *F21V 14/04* | (2006.01) |
| *H05B 33/08* | (2006.01) |
| *H02J 9/06* | (2006.01) |
| *F21S 9/02* | (2006.01) |
| *F21K 9/27* | (2016.01) |
| *F21V 7/00* | (2006.01) |
| *F21V 17/00* | (2006.01) |
| *F21V 17/06* | (2006.01) |
| *F21Y 113/00* | (2016.01) |
| *F21Y 105/16* | (2016.01) |
| *F21K 9/68* | (2016.01) |

(52) U.S. Cl.
CPC .......... *H05B 33/0803* (2013.01); *F21K 9/27* (2016.08); *F21S 9/022* (2013.01); *H02J 9/065* (2013.01); *F21K 9/68* (2016.08); *F21V 7/005* (2013.01); *F21V 7/0058* (2013.01); *F21V 17/002* (2013.01); *F21V 17/06* (2013.01); *F21Y 2105/16* (2016.08); *F21Y 2113/00* (2013.01); *Y02B 20/383* (2013.01)

(58) Field of Classification Search
CPC ...... F21V 17/02; F21V 17/002; F21V 17/005; F21V 17/06; F21V 17/104; F21V 17/164; F21V 14/04; F21V 11/18; F21V 7/16; F21V 7/005; F21V 7/0066
USPC .......... 362/217.05, 346, 347, 345, 282, 283, 362/322, 323, 341
See application file for complete search history.

(56) References Cited

U.S. PATENT DOCUMENTS

| | | | | |
|---|---|---|---|---|
| 4,599,684 | A * | 7/1986 | Lee | 362/346 |
| 4,928,209 | A * | 5/1990 | Rodin | F21V 7/005 |
| | | | | 362/217.06 |
| 4,933,823 | A * | 6/1990 | Taylor | F21V 7/22 |
| | | | | 359/884 |
| 5,025,356 | A * | 6/1991 | Gawad | 362/221 |
| 5,134,553 | A * | 7/1992 | Hasegawa | 362/223 |
| 6,536,924 | B2 * | 3/2003 | Segretto | 362/345 |
| 6,979,097 | B2 | 12/2005 | Elam et al. | 362/148 |
| 7,114,830 | B2 | 10/2006 | Robertson et al. | 362/240 |

(Continued)

*Primary Examiner* — Peggy Neils
(74) *Attorney, Agent, or Firm* — L.C. Begin & Associates, PLLC.

(57) ABSTRACT

The present invention includes a removable lighting assembly containing: a housing; a solid state lighting unit contained within the housing and electronically communicating with the housing; and a deflector fixed about the solid state lighting unit for deflection of the light emanating therefrom.

11 Claims, 48 Drawing Sheets

(56) References Cited

U.S. PATENT DOCUMENTS

| | | | |
|---|---|---|---|
| 7,507,001 B2 | 3/2009 | Kit | 362/276 |
| 7,670,032 B2* | 3/2010 | Lau | 362/322 |
| 7,677,764 B2* | 3/2010 | Lin | 362/283 |
| 7,784,966 B2 | 8/2010 | Verfuerth et al. | 362/221 |
| 7,802,902 B2 | 9/2010 | Moss et al. | 362/249.02 |
| 7,862,198 B2* | 1/2011 | Shyu et al. | 362/192 |
| 7,905,626 B2 | 3/2011 | Shantha et al. | 362/228 |
| 7,988,339 B2* | 8/2011 | Chiang et al. | 362/317 |
| 8,016,456 B2* | 9/2011 | Paravantsos et al. | 362/282 |
| 8,057,061 B2* | 11/2011 | Otsuki et al. | 362/125 |
| 8,061,867 B2* | 11/2011 | Kim et al. | 362/217.17 |
| 8,136,958 B2 | 3/2012 | Verfuerth et al. | 362/221 |
| 8,235,554 B2* | 8/2012 | Steinkraus | 362/283 |
| 8,240,876 B2* | 8/2012 | Kong | 362/217.05 |
| 8,319,437 B2 | 11/2012 | Carlin et al. | 315/113 |
| 8,388,192 B2* | 3/2013 | Guercio | 362/320 |
| 2005/0201088 A1* | 9/2005 | Stach et al. | 362/225 |
| 2006/0164841 A1* | 7/2006 | Haugaard et al. | 362/341 |
| 2007/0047243 A1 | 3/2007 | Hacker et al. | 362/382 |
| 2007/0189015 A1* | 8/2007 | Chang et al. | 362/341 |
| 2007/0247856 A1* | 10/2007 | Wang et al. | 362/297 |
| 2008/0278943 A1* | 11/2008 | Van Der Poel | F21V 7/0008 362/240 |
| 2010/0246186 A1* | 9/2010 | Chang | F21V 7/0008 362/294 |
| 2010/0309647 A1* | 12/2010 | Winkler | C09K 11/7734 362/84 |
| 2012/0195032 A1 | 8/2012 | Shew | 362/183 |

* cited by examiner

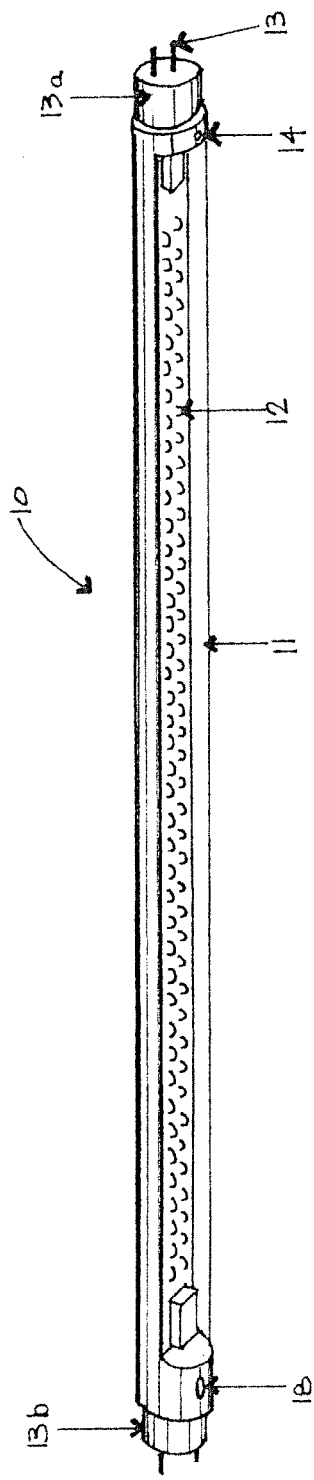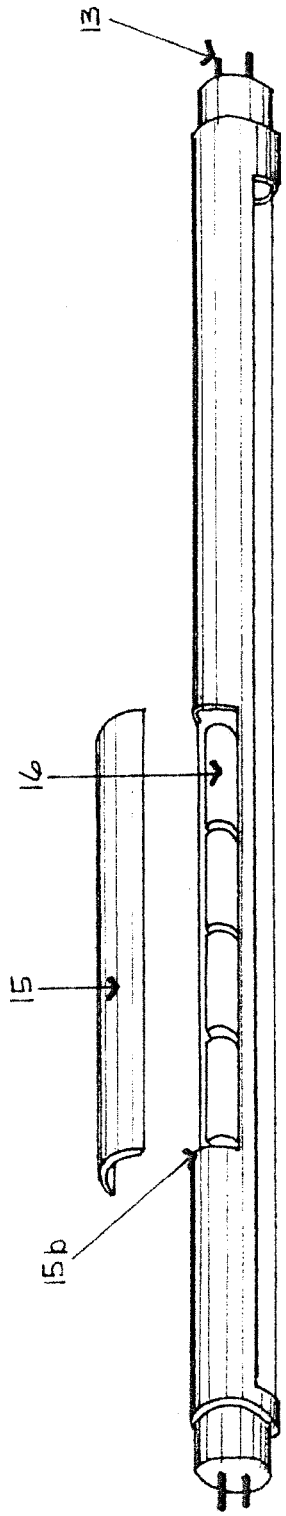

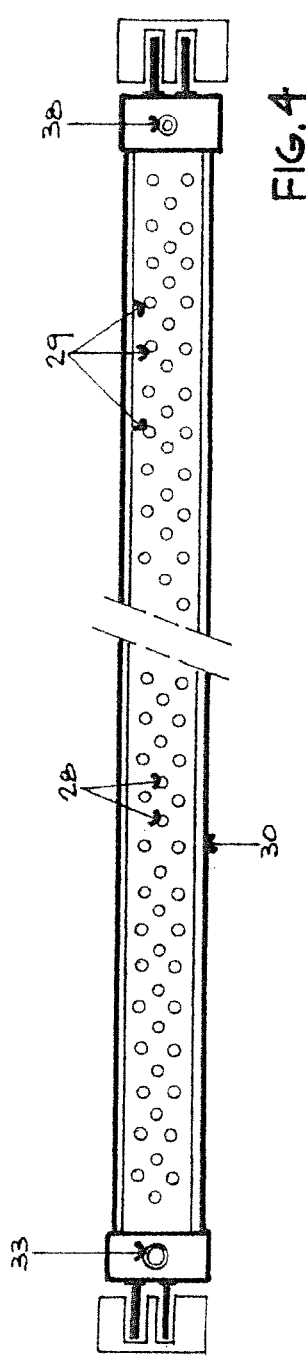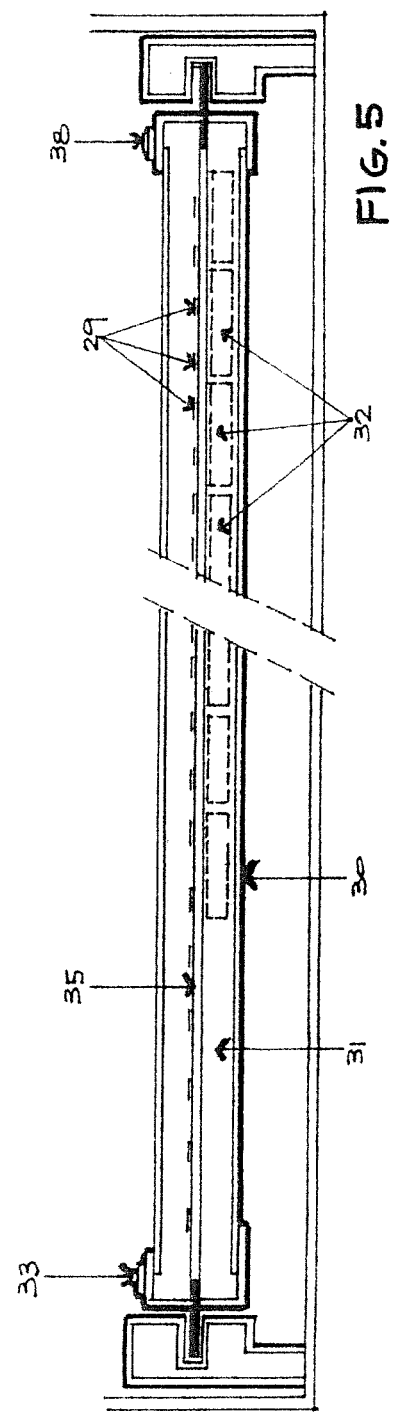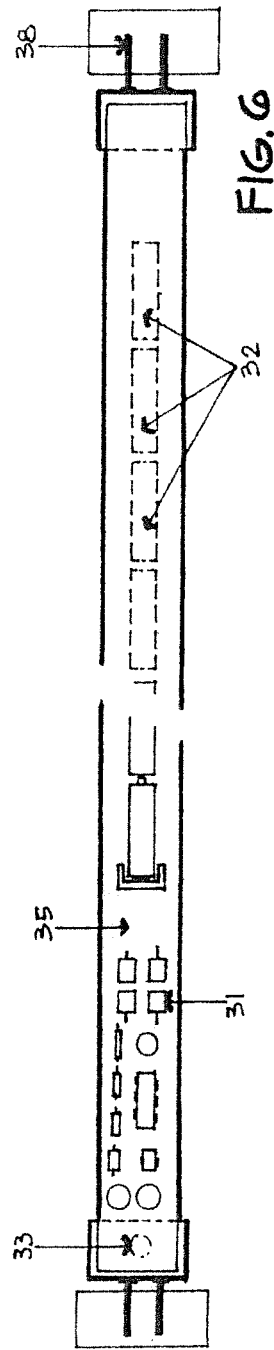

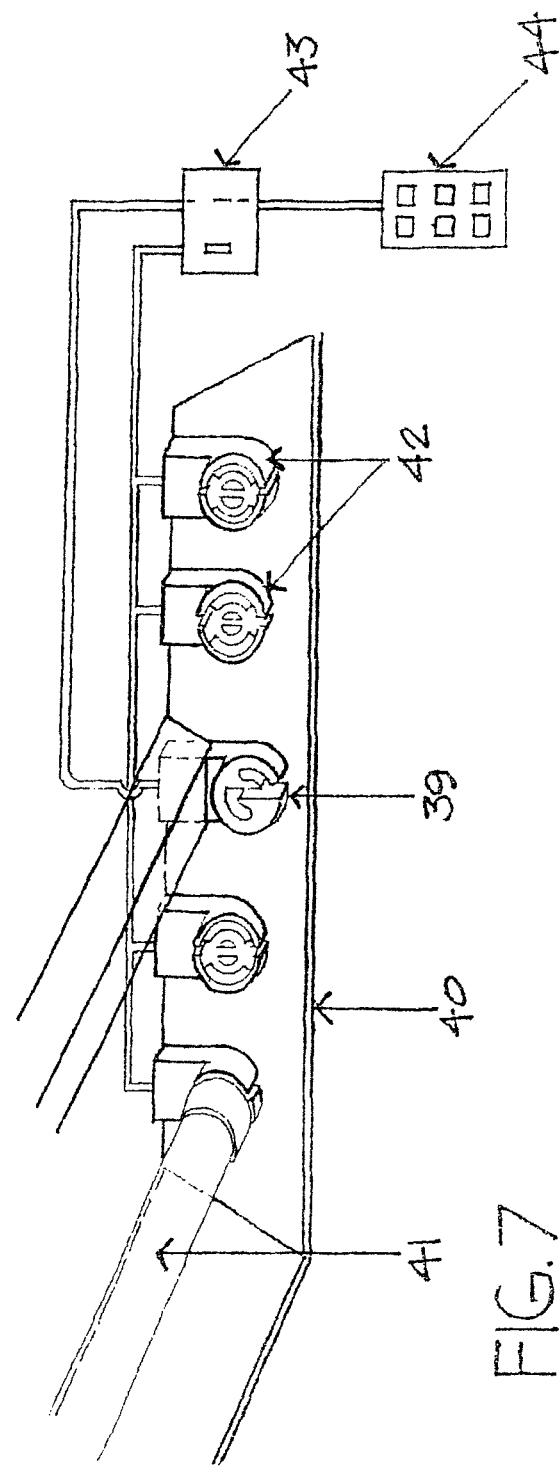

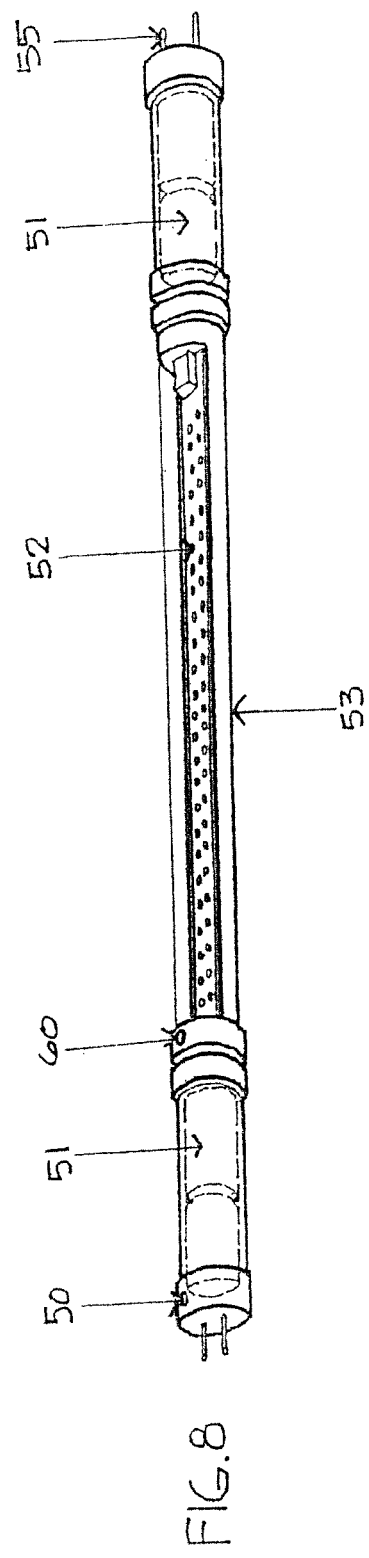
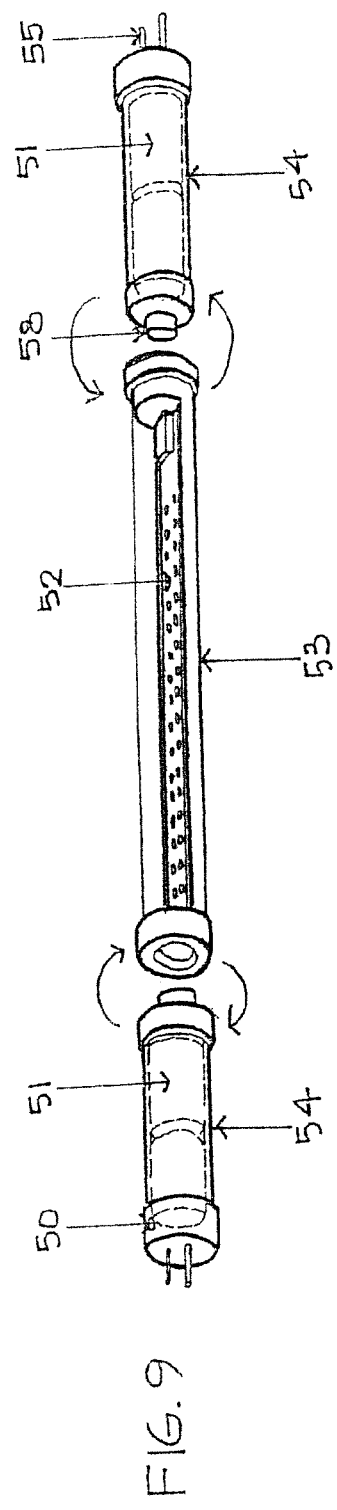

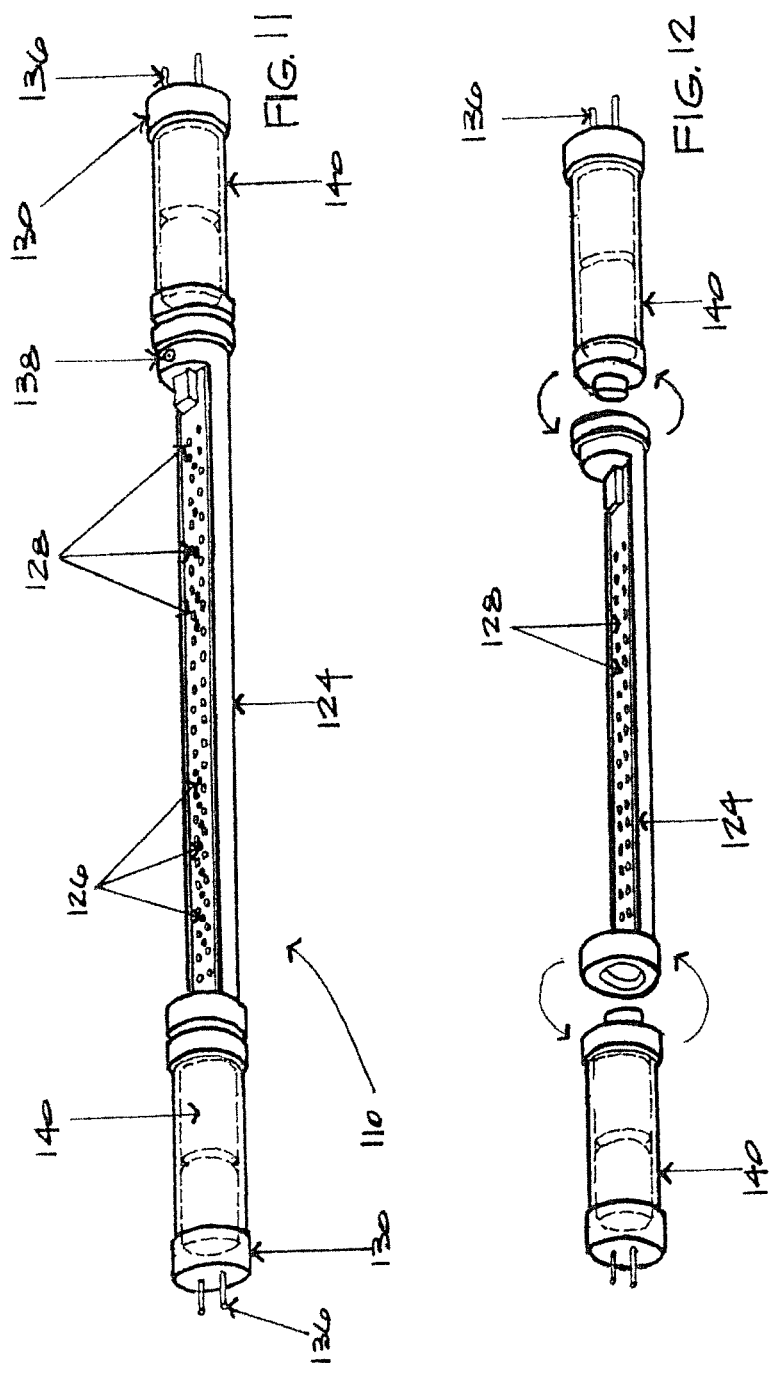

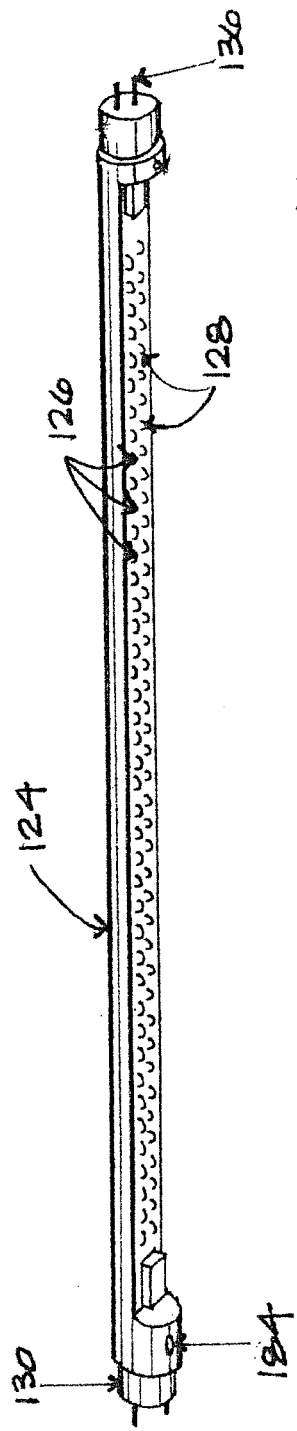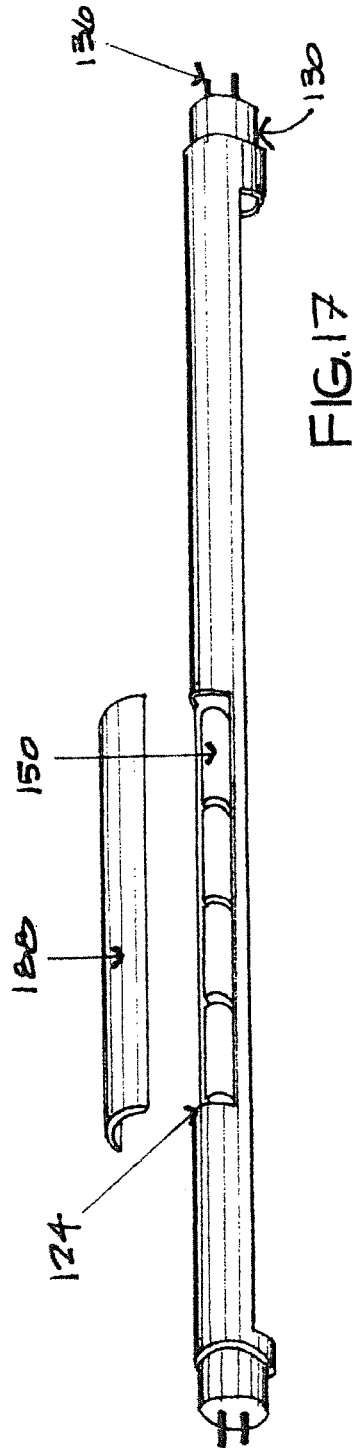
FIG.16
FIG.17

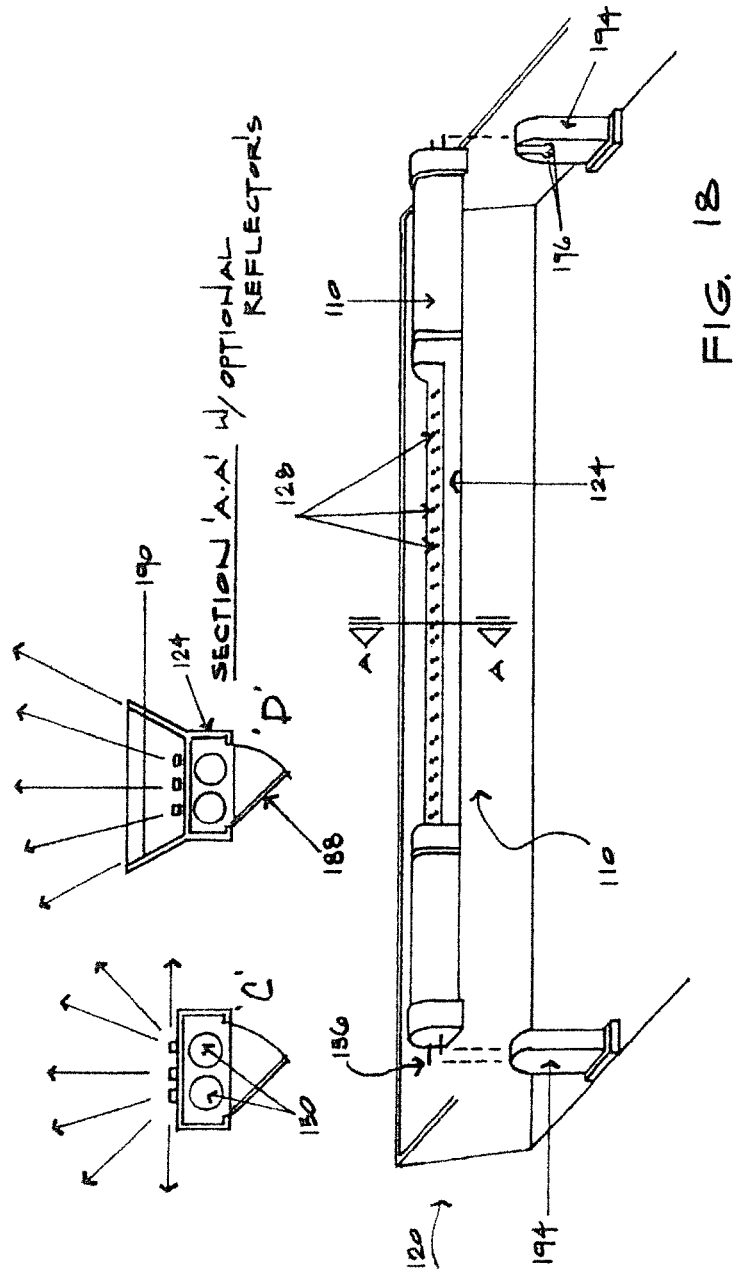

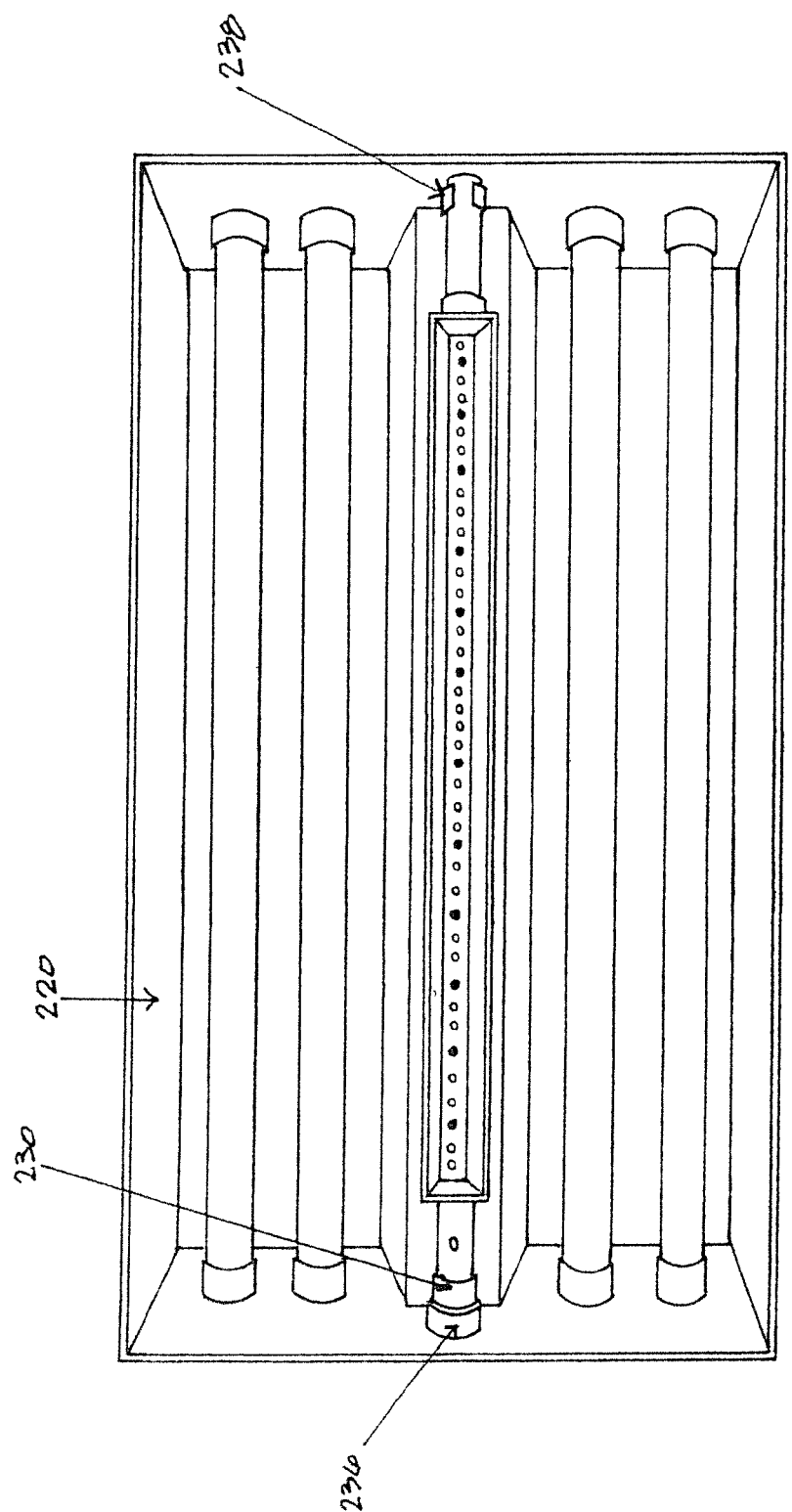

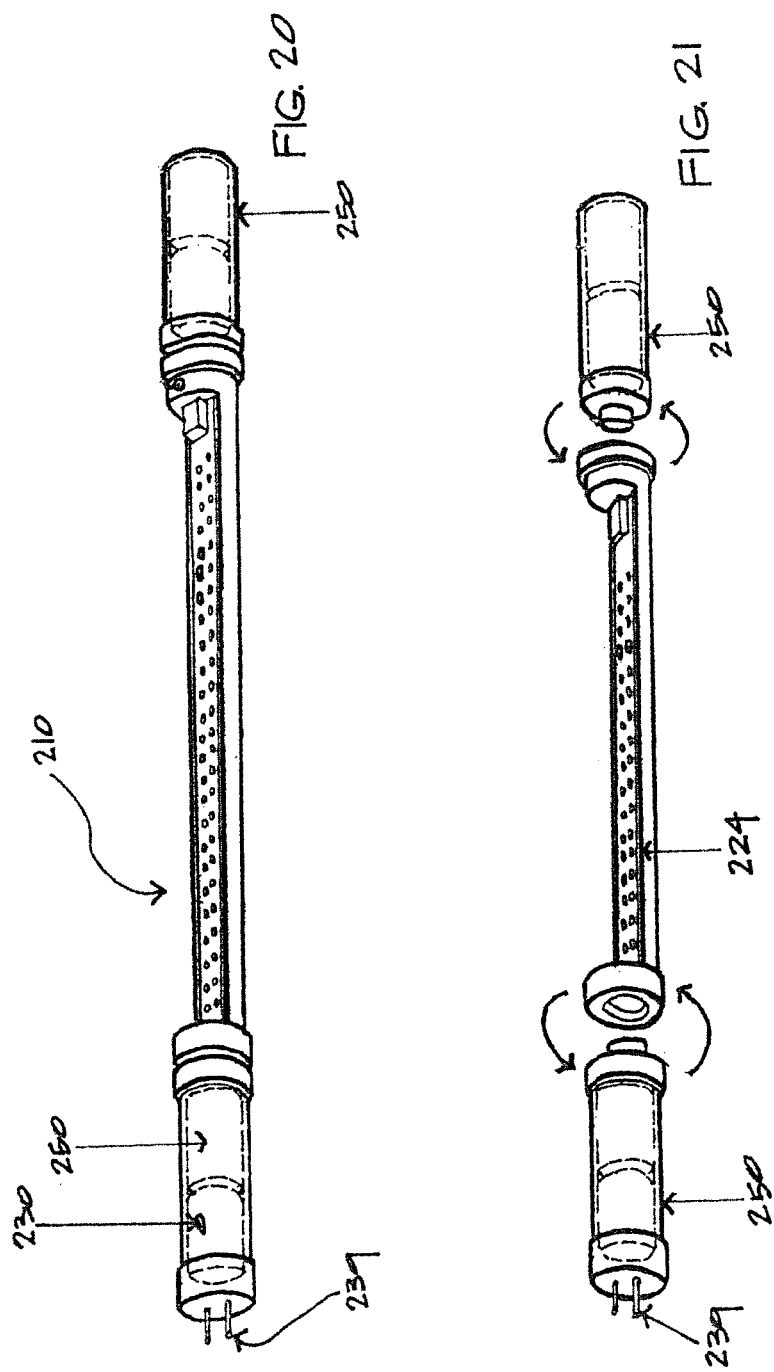

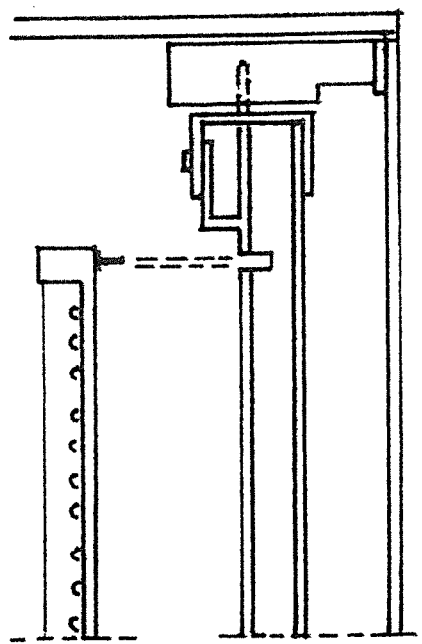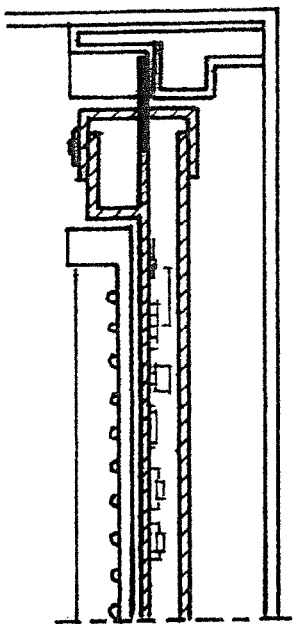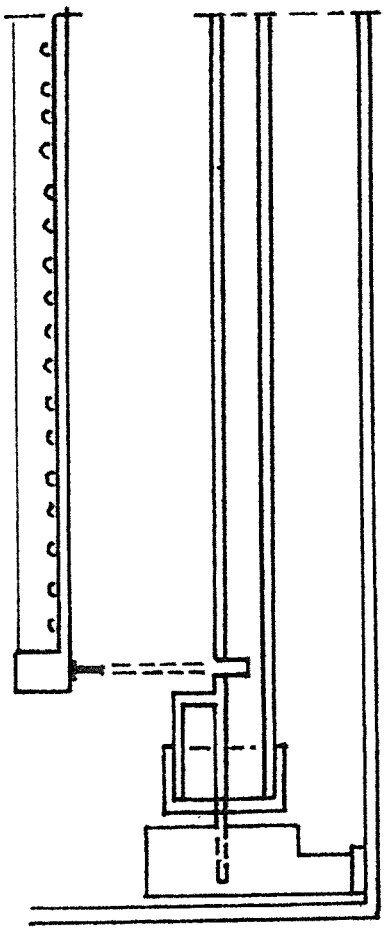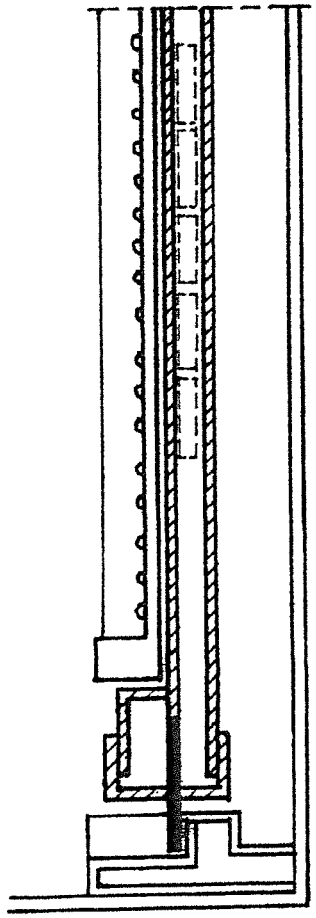
FIG. 32
FIG. 33

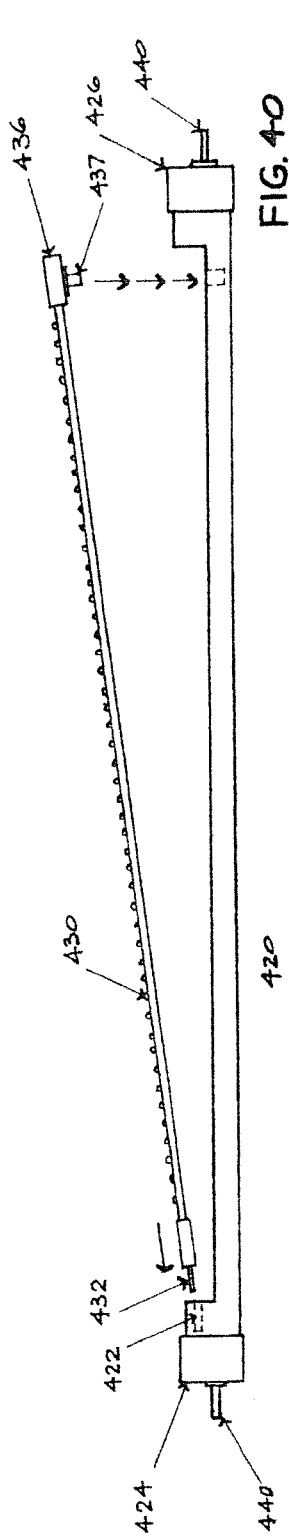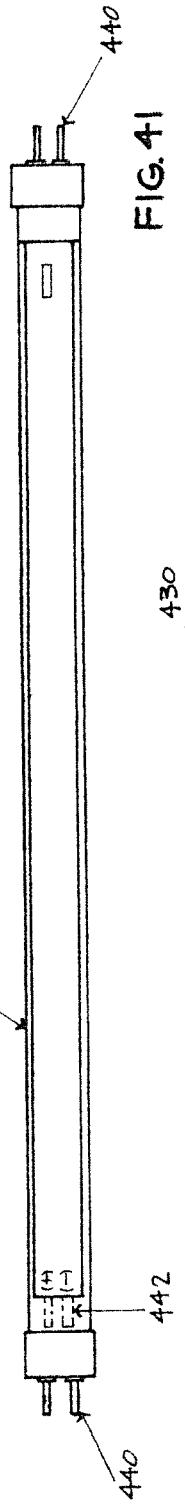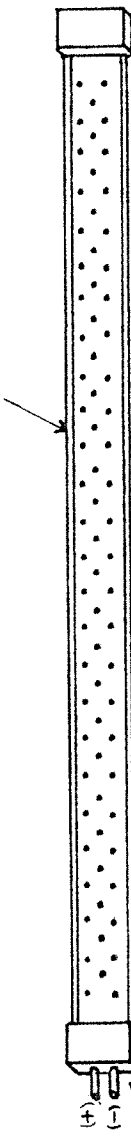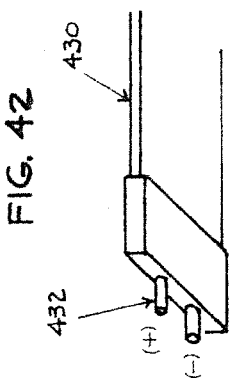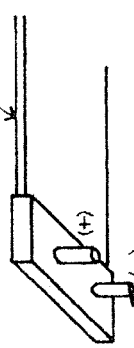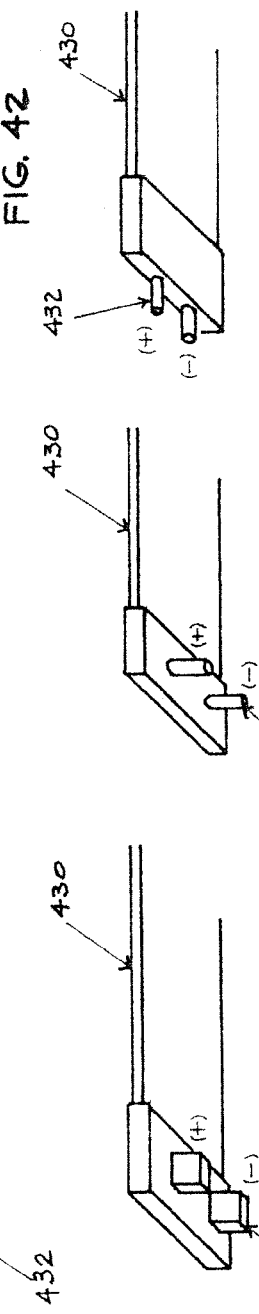

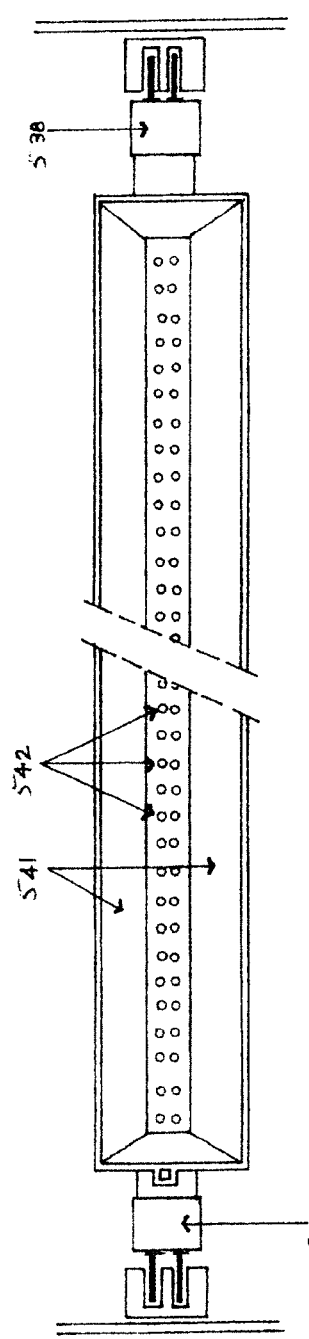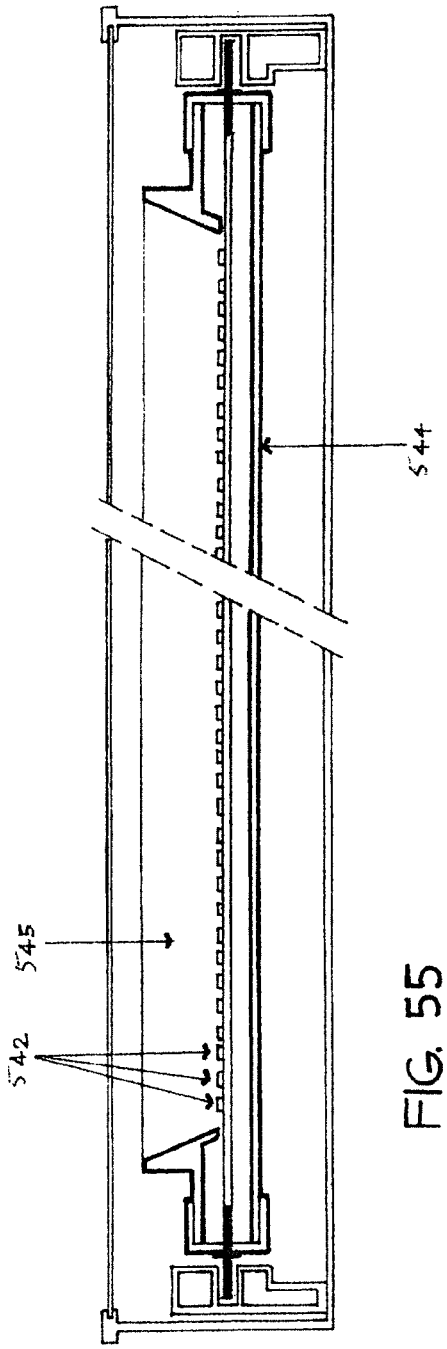
FIG. 54
FIG. 55

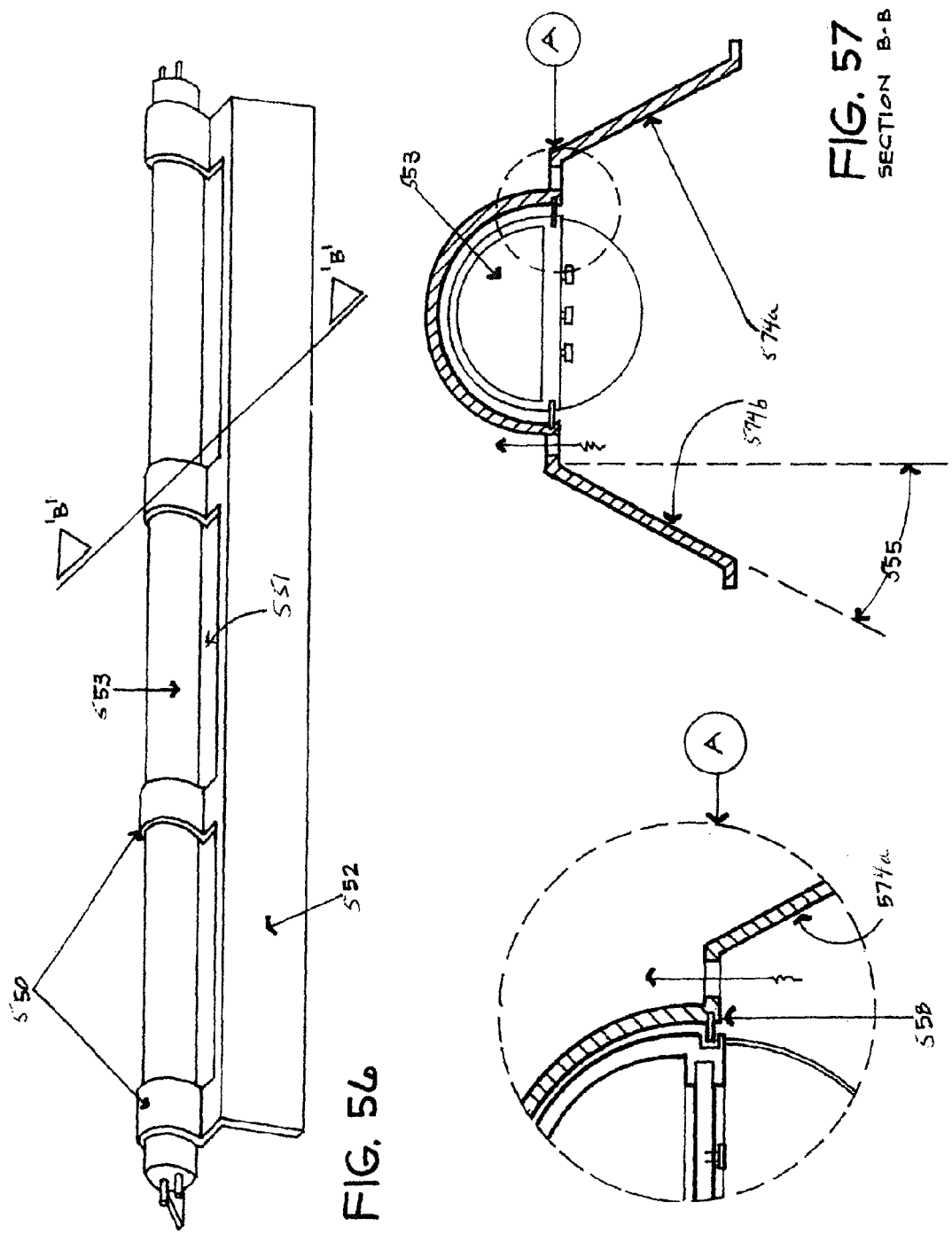

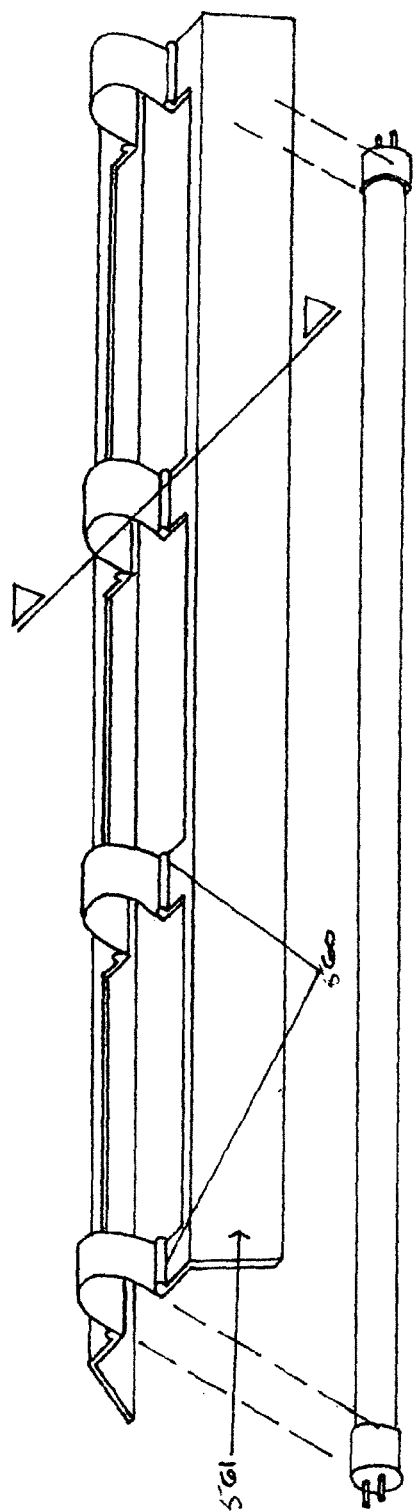
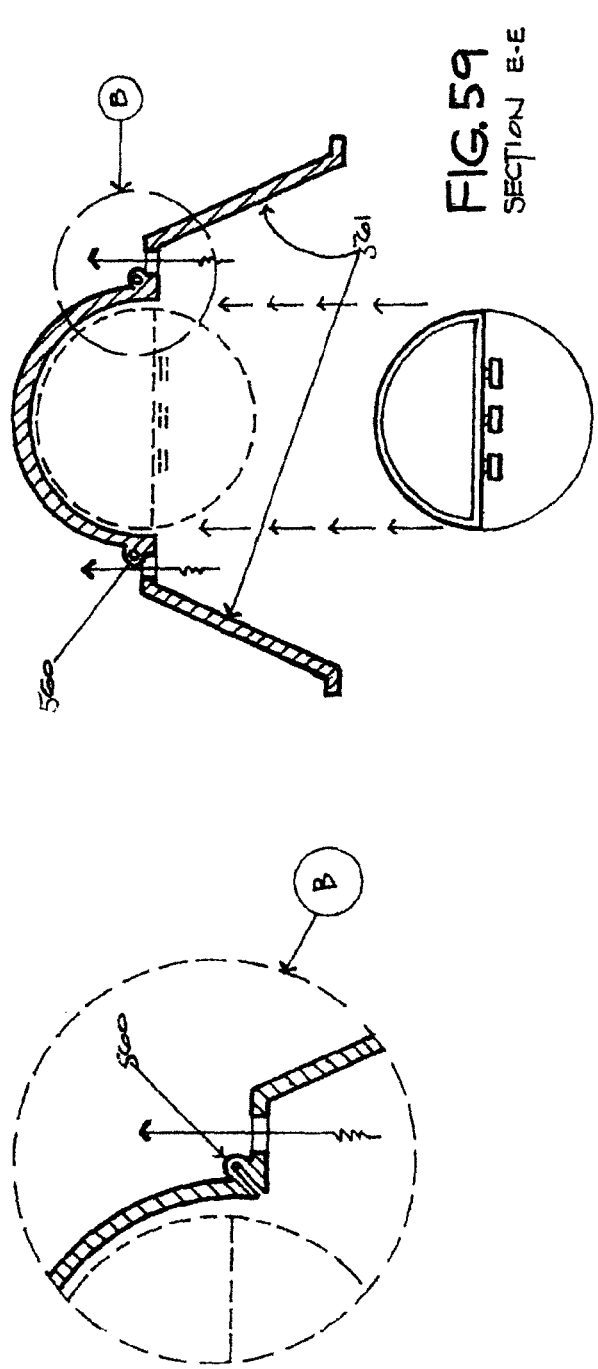
FIG. 58
FIG. 59 SECTION E-E

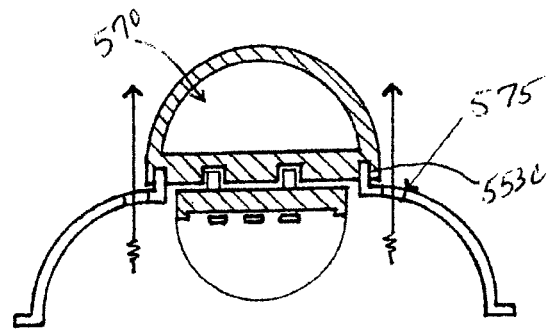
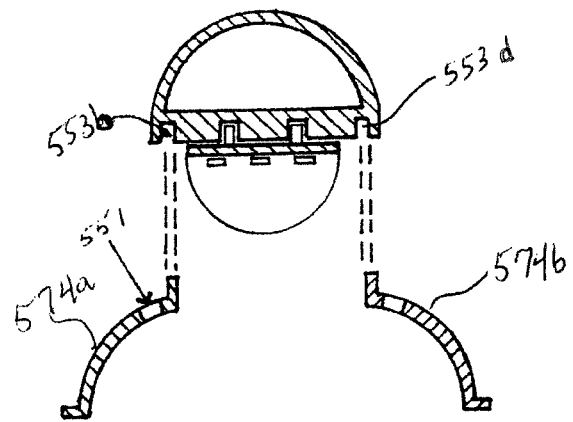
FIG. 61

LIGHTING SYSTEM AND METHOD OF DEFLECTION

CROSS REFERENCE TO RELATED APPLICATIONS

This application claims the benefit of U.S. Provisional Application Ser. No. 61/476,374 filed on Apr. 18, 2011. This application also claims the benefit of and is a continuation-in-part of co-pending U.S. application Ser. No. 12/983,227 having a filing date of Dec. 31, 2010 now U.S. Pat. No. 8,770,770 (which claims the benefit of U.S. Provisional Application No. 61/335,132 filed on Dec. 31, 2009). This application also claims the benefit of and is a continuation-in-part of co-pending U.S. application Ser. No. 13/417,169 having a filing date of Mar. 9, 2012 (which claims the benefit of U.S. Provisional Application No. 61/450,825 filed on Mar. 9, 2011). This application also claims the benefit of and is a continuation-in-part of co-pending U.S. application Ser. No. 13/442,843 having a filing date of Apr. 9, 2012 (which claims the benefit of U.S. Provisional Application Ser. No. 61/473,769 filed on Apr. 9, 2011).

BACKGROUND OF THE INVENTION

The present invention relates to light assemblies that incorporate a night-light and/or an emergency light within an LED (light emitting diode) light assembly. Alternatively, the novel LED light assembly of the present invention may be designed into a single light source having a multi-functional light. During the day, the LED light assembly will function as the primary light source, operating all the LEDs within the light assembly. During the night, the LED light assembly will function as a night light, operating only a limited number of LEDs to avoid complete darkness within the space and during a power loss, operating the same number of LEDs to again avoid darkness. The inventor contemplates that these concerns may most efficiently be managed during the construction of a new home or new commercial building.

Presently, there are various conventional light fixtures that incorporate emergency lighting, and are powered by AC energy with battery backup. When the power is unexpectedly interrupted due to a storm or other event, the emergency lighting automatically illuminates. Cost is one issue related to most of these conventional emergency lighting systems as they are very expensive.

Yet another issue for a conventional stand-alone emergency lighting system that may contain incandescent, fluorescent or halogen lamp and may be powered by expensive, alkaline, sealed lead battery modules is the relatively short charge time. Many of these conventional systems are generally only designed to provide at a maximum between one to three hours of effective emergency lighting. Not only is this approach expensive, this presents a concern for emergency generated power outages that last longer than three hours.

Yet another issue is that current design trends favor the spatial and aesthetic benefits typically provided by fluorescent tubes, even though fluorescent tubes cost more to operate than LED assemblies.

Yet another concern is the cost of illuminating conventional lighting such as incandescent, fluorescent, or halogenated light sources.

Fixtures using fluorescent tubes or LED light assemblies as its source of lighting are common in homes, offices and retail stores. Fluorescent tubes may typically use 60-80% more energy than LED light tubes. Fluorescent lighting system are not practicable for such emergency lighting due to their high voltage and alternating current requirements making a battery backup difficult during power failure. It is therefore an ongoing effort to improve LED lighting sources to provide adequate lighting for longer periods while reducing the manufacturing and operating costs.

Typical LED light tube assemblies currently on the market operate only as a primary light source for the home and the work place. As a way to provide night lighting within a space, owners typically would leave on several light fixtures during the night. As energy costs continue to grow, owners are looking for other options to reduce energy cost. The present invention would mitigate the need of leaving several light fixtures on during the night, saving energy cost for the owner. The present invention may also provide additional operating time during a power failure, at the same time improving the light quality of the night-light at night.

One concern with the use of LED tubular light bulbs is the heat retention within the lighting assemblies. Heat management is an ongoing challenge to ensure that the LED light assemblies enjoy a reasonable longevity and lifetime of use.

Yet another concern is that the use of the LED light or other solid state lighting might be effectively accomplished without the use of bulbs, further in keeping with the heat management concern.

Yet another concern is that the light generated by solid state lighting such as LED and fluorescent tubes for example only, might be more efficiently utilized by directing the light more effectively to target areas of illumination.

It would therefore be an improvement in the art to provide an LED lighting assembly that resolves the aforementioned concerns.

SUMMARY OF THE INVENTION

The above-referenced concerns are resolved by providing a first embodiment of an LED lighting assembly containing: a housing; one or more solid state lighting units contained within the housing and actuated by alternating current power; a night light contained within the housing and operably communicating with the solid state lighting units, the night light actuated by direct current power in the absence of light from the solid state lighting units; one or more light emitting diodes contained within the night light; and a battery source for powering the night light in the event of power interruption.

A second embodiment of an LED lighting assembly in accordance with the present invention includes a light assembly containing: a housing; one or more solid state lighting units contained within the housing and actuated by alternating current power; a night light contained within the housing and operably communicating with the solid state lighting units, the night light actuated by direct current power in the absence of light from the solid state lighting units; and a direct current power supply contained within the housing and operably communicating with the night light; one or more light emitting diodes contained within the night light and powered by the direct current power supply; a battery source for powering the night light in the event of power interruption; and a battery charger within the housing and actuated by direct current power, the battery charger operably communicating with the battery source.

In yet another aspect of the invention, a lighting unit contains: a housing or elongated tube; one or more light emitting diodes contained within the housing or elongated tube; and a battery source contained within the housing or elongated tube, the battery source configured to selectively power the light emitting diodes with direct current energy.

In yet another aspect of the present invention, a lighting unit contains: a tubeless and bulb-free sub-housing in contrast to and as distinguished by the tubular bulbs typically used in fluorescent tube technology for example; a first array containing one or more light emitting diodes (LEDs) contained within the bulb-free sub-housing that function as a direct current- or DC-powered emergency/night light; a second array containing one or more light emitting diodes contained within the bulb-free housing that function as an alternating current or AC solid state lighting by converting the AC power to DC power for operation of the LEDs; a battery source contained within the housing or elongated tube, the battery source configured to selectively power the first array of LEDs with DC power in the absence of AC power; and a photo-switch/sensor that selectively actuates the first array of LEDs and powers them with AC/DC power in normal operation of the lighting unit.

In yet another aspect of the present invention, a lighting unit or assembly contains: any one of the embodiments of the present invention containing a light deflector or reflector for predetermined distribution of the light emanating from the light assemblies or modular LED light assemblies of the present invention. The light deflector may or may not be adjustable to tailor the intensity of the light directed below.

In yet another aspect of the present invention, a modular lighting unit is presented that contributes to a reduction in waste caused by disposing of an entire LED bulb or assembly when light emitting diodes therein burn out. The energy benefit of providing LEDs is retained while yet providing a means to replace the LEDs without requiring replacement of the entire lighting assembly. Accordingly, one or more modular LED lighting strips or modules may be provided for easy insertion and extraction from housing inserts containing the same. The housing inserts containing the modular LED light strips are formed to provide ready placement within known troffer light fixtures typically containing fluorescent light tubes.

Stated another way, the present invention includes an LED lighting fixture containing: a housing insert electronically communicating with the light fixture; and one or more LED modules electronically communicating with the housing insert upon receipt of direct current power from the housing insert. One or more LED modules are removably seated within the housing insert for ready replacement of the LED modules while conserving unnecessary waste by preserving the continued use of the housing insert.

In yet another aspect of the present invention, a lighting unit or assembly contains: any one of the embodiments of the present invention containing a light deflector or reflector for predetermined distribution of the light emanating from the light assemblies or modular LED light assemblies of the present invention. The light deflector may or may not be adjustable to tailor the intensity of the light directed below.

In yet another aspect of the present invention, a modular lighting unit is presented that contributes to a reduction in waste caused by disposing of an entire LED bulb or assembly when light emitting diodes therein burn out. The energy benefit of providing LEDs is retained while yet providing a means to replace the LEDs without requiring replacement of the entire lighting assembly. Accordingly, one or more modular LED lighting strips or modules may be provided for easy insertion and extraction from housing inserts containing the same. The housing inserts containing the modular LED light strips are formed to provide ready placement within known troffer light fixtures typically containing fluorescent light tubes.

BRIEF DESCRIPTION OF THE DRAWINGS

FIG. 1 illustrates a perspective view of one embodiment of a light assembly in accordance with the present invention.

FIG. 2 illustrates a perspective view of one embodiment of a light assembly in accordance with the present invention.

FIG. 4 illustrates a top view of one embodiment of a light assembly in accordance with the present invention.

FIG. 5 illustrates a cross-section view of one embodiment of a light assembly in accordance with the present invention.

FIG. 6 illustrates a view of a circuit board of one embodiment of a light assembly in accordance with the present invention.

FIG. 7 illustrates a perspective view of an end portion of a fluorescent troffer in accordance with the present invention.

FIG. 8 illustrates a perspective view of a second embodiment of a light assembly in accordance with the present invention.

FIG. 9 illustrates a perspective view of a second embodiment showing the connections between the lithium batteries and the light emitting diode(s) in accordance with the present invention.

FIG. 11 is an embodiment of the present invention incorporating a bulb-free and open housing.

FIG. 12 is another view of the embodiment of FIG. 11.

FIG. 16 is a perspective view of yet another embodiment illustrating an open and bulb-free sub-housing, the embodiment functioning as a replacement to typical fluorescent tubes.

FIG. 17 is a bottom view of the embodiment of FIG. 13, illustrating the access panel to service the battery source.

FIG. 18 is a view of yet another embodiment similar to the embodiment of FIG. 11, wherein reflective portions are illustrated that direct the radiation of the light.

FIG. 19 is a view of a conventional troffer or housing containing both fluorescent and a light assembly in accordance with the present invention.

FIG. 20 is a view of a light assembly similar to FIG. 11, but having only one end cap for electrical communication with an associated troffer or housing.

FIG. 21 is a view of the light assembly of FIG. 20 illustrating the removable battery compartments.

FIG. 32 illustrates another embodiment of a replacement light assembly for a fluorescent tube troffer, the figure schematically illustrating the assembly containing known LED bulb circuitry and further containing a modular LED insert for insertion within a housing insert.

FIG. 33 illustrates a side view of the embodiment of FIG. 32 wherein the LED insert is placed within the housing insert.

FIG. 40 schematically illustrates a side view of a housing insert containing known LED circuitry used within a troffer light fixture for fluorescent tubes, and further illustrates a modular LED insert for placement within the housing insert.

FIG. 41 schematically illustrates a top view of the housing insert or socket of the embodiment of FIG. 40.

FIG. 42 illustrates a top view of the modular LED light strip of FIG. 40.

FIGS. 43*a* through 43*c* illustrate an exemplary variety of plugs or prongs contained in the modular LED light strips of the present invention.

FIG. 54 illustrates a light assembly similar to the embodiment of FIG. 51, as installed within a troffer.

FIG. 55 illustrates a side view of the embodiment of FIG. 54.

FIG. 56 illustrates a deflector as snap fit upon and/or saddled over a light assembly containing LEDs, in accordance with the present invention.

FIG. 57 illustrates angular displacement of a deflector, as shown in FIG. 56 for example, and as seen from a side view.

FIG. 58 illustrates the snap-fit or cooperating nature of the shroud or deflector panels of FIG. 56 as shown in exploded view.

FIG. 59 illustrates a light assembly groove and a deflector panel bulbous portion that when mated together provide seating of the shroud or deflector panels over the light assembly or tube.

FIG. 61 illustrates various arcuate lengths that may be optionally provided by snap-fit deflectors of various arcuate form, to vary the displacement between a vertical plane bisecting the LED tube or light assembly and the deflector panels.

DETAILED DESCRIPTION OF THE PREFERRED EMBODIMENT(S)

Figure 3:
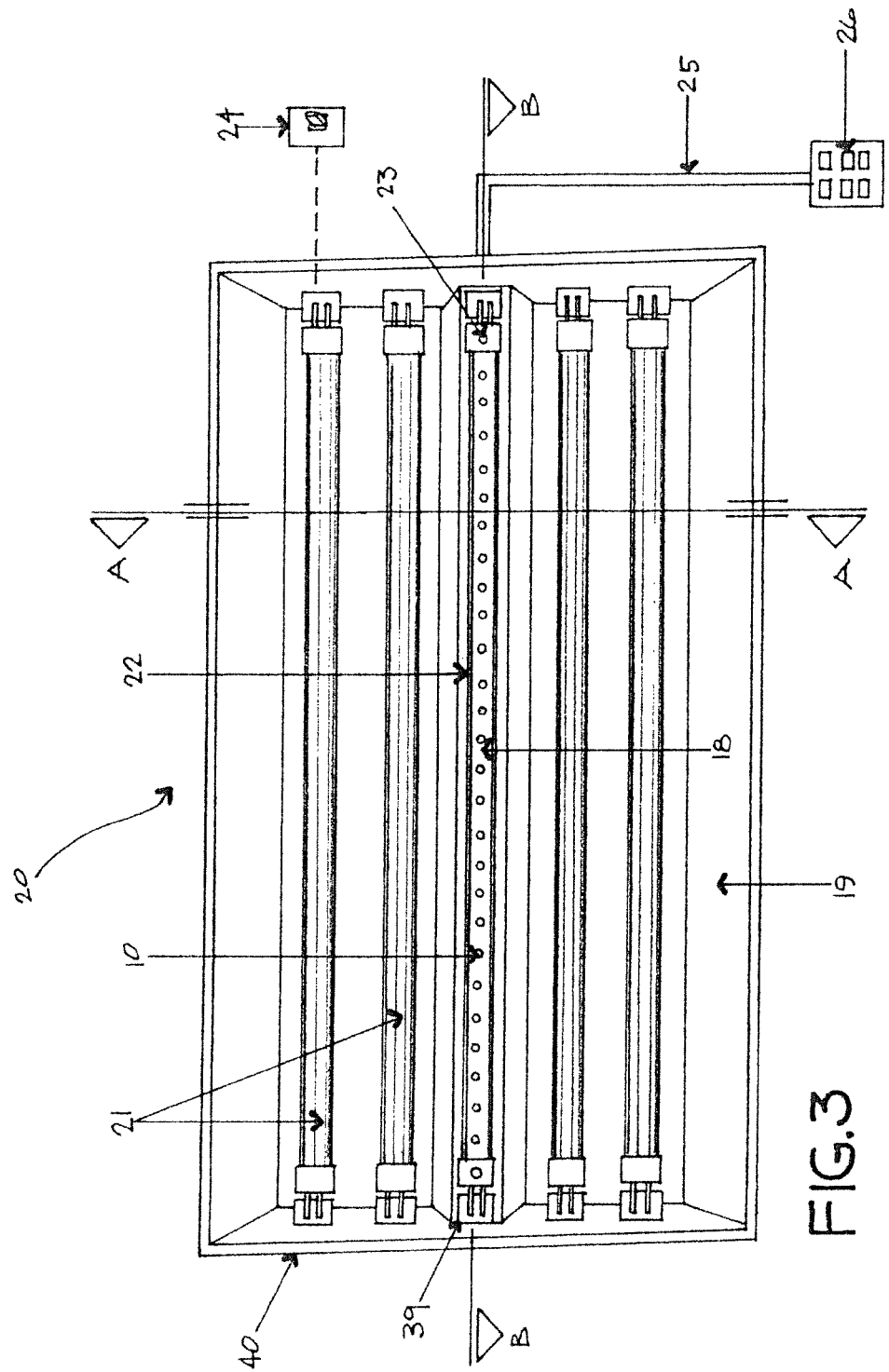
FIG. 3 illustrates a view of one embodiment of a light assembly within a conventional fluorescent troffer assembly, in accordance with the present invention.

FIG. 1 is an illustration of a perspective view of a first embodiment of an emergency or backup lighting assembly 10 employing one or more light emitting diodes (LEDs). A housing or elongated tube 11 contains all internal circuitry and lighting as described below and may be manufactured as known in the art. In general, the tube 11 may be substantially similar to the housing or tube typically employed for a fluorescent light bulb, for example.

As shown in FIG. 1, an array or subassembly 12 of one or more light emitting diodes is contained within the housing 11 and may be substantially coextensive with the housing 11. The array 12 may be formed as known in the art. At least one power supply connector 13 is provided at a first end 13a for charging the batteries as explained below. In the embodiment shown in FIG. 1, a first and a second connector 13 are provided at a first end 13a and a second end 13b, respectively. A photocell switch 14 operably communicates with the LED circuitry to provide direct current (DC) or power thereto, and actuates and deactivates the LED circuitry when light is absent or present, respectively.

As shown in FIG. 2, a panel 15 is removably fixed to housing 11 and covers an inner cavity or recess 15b. One or more batteries 16, preferably lithium rechargeable batteries, may be stored within recess 15b and provide DC power to the LED array 12 upon switching of photocell switch 14. A test circuit 18 may be provided on the outer housing 11 to provide convenient testing of the emergency lighting circuitry.

In one embodiment shown in FIG. 3, a conventional fluorescent light assembly 19 is provided in accordance with the present invention. A troffer or housing 20 contains one or more fluorescent tubes 21, all AC (alternating current) powered in a conventional manner. Other solid state lighting assemblies/units 21 are contemplated in accordance with the present invention, and may include other solid state lighting units such as incandescent, LED, mercury-based, and other types of solid state lighting units. As also indicated or alluded to in FIG. 3, a ballast (not shown) may also be provided to control the electric current applied to the fluorescent tubes 21. A ballast cover 22 may be provided down the center of the solid state lighting unit 21 thereby hiding the ballast area from view. FIG. 3 also illustrates an elongated LED night light assembly 10, retained outside of the ballast cover 22. One or more sockets 39 receive one or more corresponding connectors 13 at ends 13a and 13b of light assembly 10, thereby providing alternating current power to the night light assembly 10 to at least one of the connectors 13. Alternating current may be directly provided by a continuous circuit from service/power box 26 to socket(s) 39 vis a vis line 25, for example. The fluorescent bulb(s) 21 function as the primary light, and are operated by a remote switch 24. A photocell switch 23 operatively communicates with light assembly 10 to activate and deactivate the light assembly 10 by turning the bulb(s) 21 off and on, respectively. Accordingly, as the bulbs 21 are turned off at the end of the day, the photocell 23 will recognize the waning light and activate the light assembly 10. On the other hand, when the lights 21 are turned on, the photocell 24 will recognize the increasing light and deactivate the light assembly 10.

Figure 10:
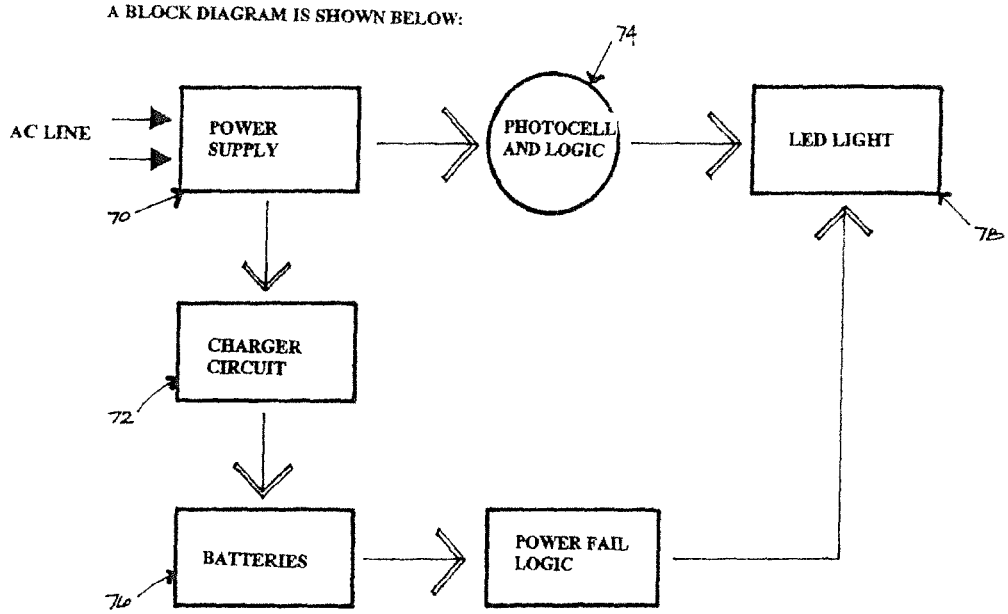
FIG. 10 is a schematic of the operation of a lighting unit in accordance with the present invention.

FIG. 7 exemplifies one end 40 of the troffer or housing 20 of FIG. 3. Sockets 42 are configured to receive conventional solid state lighting units such as fluorescent or LED tubes, while socket 39 is configured to receive a night or emergency light unit 10 in accordance with the present invention. A three-wire system is illustrated in FIG. 7 and eliminates the need for a toggle switch or other switch as the actuation and de-actuation means for the fluorescent or other solid state lighting source and the second light source (night light). Referring to FIGS. 3, 7, and 10, the LED array 78 powered by sockets 39 is activated by electronic communication with a standard AC power supply 44 (e.g. 110 VAC). As photocell 43 detects a darkened condition, alternating current in normal circumstances is then only applied to socket 39, and not to sockets 42. As shown in FIGS. 3-6, for example, the periphery of the housings 30 is generally depicted as being circumferential. It will be appreciated that the peripheral geometry of the housing 30 may be formed to accommodate the spatial requirements of the circuitry 35, and may therefore for example only, take on a "half-rectangular" cross-section to fit in the requisite components. Nevertheless, the circumferential geometry of the housing 30 is preferably maintained at least around the ends 13a and 13b to facilitate a ready receipt of the connectors 34 within the female sockets.

Various other optional features such as dimmer switches or multi-colored LEDs may be provided.

As shown in yet another embodiment in FIGS. 4, 5, and 6, a circuit board 35 is contained within night light housing 30 and provides circuitry to convert an incoming 110 VAC to 12-15 VDC. A photocell 38 is provided at one end of the housing 30, and as explained below relative to FIG. 10, operably communicates with the LED array 29 to provide DC power in the absence of light from the primary light source (not shown in these figures). Batteries 32 are contained within housing 30 and operably communicate with circuitry 31 and 35 (as explained relative to FIG. 10) in the event of a power interruption. A test control 33 is coupled to the LED array 29 and is useful for service tests to comply with regulatory requirements on periodic testing of emergency service equipment.

An AC/DC power supply/converter 70 is schematically shown in FIG. 10 and is provided to supply direct current power to the plurality of light emitting diodes or LED array 29. Converter 70 may, but not by way of limitation, be provided by V-Infinity of Oregon as identified as part number FSC-S15-15U, for example. It will be appreciated that other sources of alternating current may also be rectified or converted to appropriate amounts of direct current depending on design criteria. For example, 220 VAC could also be rectified to 15 VDC if desired.

As also schematically shown in FIG. 10, converter 70 therefore operably and electronically communicates with battery source charger 72 and to a photocell 74, thereby providing direct current power to each. Alternatively, a rectifier may instead be provided rather than the converter 70, so long as direct current power ultimately is provided in appropriate and operable amounts to the charger 72 and the LED array 78. Charger 72 electronically or operably communicates with one or more batteries 76 to maintain a charge to the rechargeable batteries 76. In the event of power failure, direct current by and through photocell 76 is interrupted due to the absence of alternating current being supplied to direct current power supply 70. Accordingly, in the event of power failure, direct current is provided from the batteries 76 to LED array 78.

Batteries 76 may be formed from nickel-metal hydrides, or from lithium ion technology. The batteries 76 may be provided from Sanyo Corporation of Japan, for example. The battery charger 72 may be, for example only and not by way of limitation, be provided from various designs available from Texas Instruments, part number bq24702, for example. The charger 72 may provide a "fast" charge for batteries depleted from a prolonged use. Or, the charger 72 may provide a "trickle" or "top off" charge to maintain the charge at a substantial maximum without overcharging. Accordingly, the charger 72 may also be designed to contain a "detector" mode whereby the charger 72 can identify whether a "fast charge" or "trickle charge" is necessary based on battery charge measurements. The LED array 78 may be provided from companies such as Stand Electronic Co., Limited located in Guangdong, China.

As also schematically exemplified in FIG. 10, the photocell 74 may for example, but not by way of limitation, be provided from Advanced Photonix, Inc. as part number PDV-P8101, and is operable based on a darkened condition, either from deactivation of the primary lighting assembly and bulbs 21, or, by the onset of a power outage with resultant darkness. LED light array 29 or 78 is thereby activated based on an absence of light from the primary light assembly and bulbs 21.

In yet another embodiment shown in FIGS. 8 and 9, batteries 51 may be provided at opposite ends of the light unit 53 thereby providing emergency or night lighting to the LED array 52. Contacts 55 may be seated within female receptacles within a light assembly such as shown in FIG. 3. As shown in FIG. 9, the batteries 51 may be placed within storage compartments 54. The compartments 54 may then be rotatably fixed in electronic contact with each end of the LED array 53, thereby providing a direct current power supply in the event of an absence of power from the alternating current supply. Although not shown, it will be appreciated that equivalent circuitry as described by FIG. 10 and as shown in FIGS. 5 and 6 as circuit board 35 are provided in light unit 53 thereby converting or rectifying alternating current to direct current in the same way as described relative to FIG. 10.

Further, the battery source may contain consumable rather than rechargeable batteries. As a result, the charger 72 would not be necessary. The "consumable" battery source would then be actuated based on a default switch from the photocell 74 for example, indicating that direct current supplied from the power supply 70 had been interrupted, whereby the LED array 78 is actuated based on normal or consumable battery power.

Figure 23:
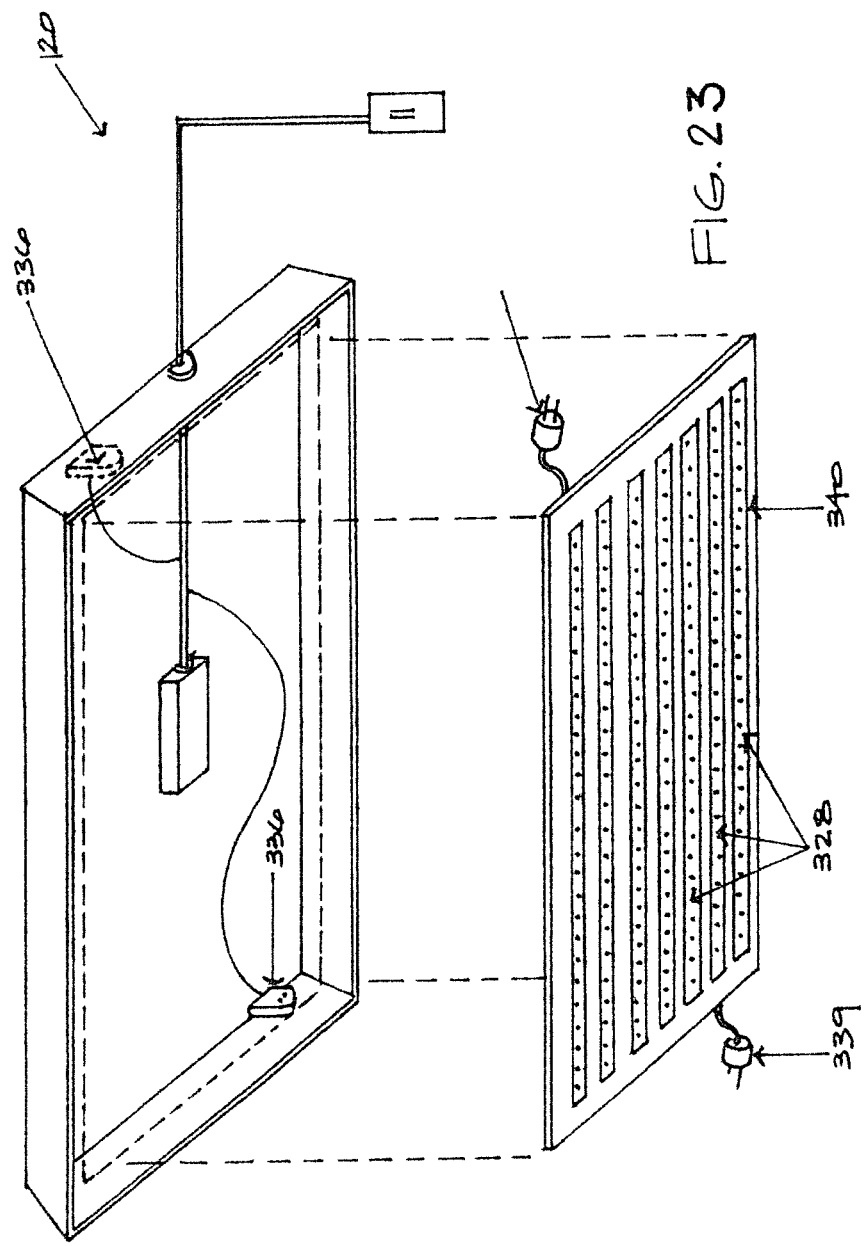
FIG. 23 illustrates a light unit and an LED panel wired in accordance with the present invention, for insertion within a troffer or housing.

In yet another aspect of the invention illustrated in FIGS. 11-27, and as particularly shown in FIG. 23, a housing or troffer 120 may be employed to contain one or more tubeless and bulb-free lighting units 122. As shown in FIG. 11, a sub-housing 124 is formed as a tubeless and bulb-free sub-housing, in contrast to and as distinguished by the tubular bulbs typically used in fluorescent tube technology, for example. The term "bulb-free" as used herein is meant to convey that the sub-housing 124 is not encased with glass or otherwise formed as a bulb or a portion of a bulb. The term "bulb-free" is not meant to convey that no bulbs are used within the sub-housing 124, light emitting diodes for example, but that the elongated housing is itself not a bulb or a bulb portion. As shown in FIG. 11, the sub-housing 124 may be elongated and coextensive with the length of a conventional fluorescent tube for example, but does not share the geometric design of the fluorescent tube/bulb. It will be appreciated that other embodiments as disclosed in FIGS. 1-9, for example, may be presented in tubular housings or bulbs. Nevertheless, because of a heat management advantage, the embodiments exemplified in FIGS. 11-26 contain one or more open bulb-free sub-housings, thereby permitting the steady-state release of heat from the sub-housing, and thereby prolonging the life of the LEDs contained within the sub-housing 124.

Referring to FIGS. 11 and 12, one embodiment of a tubeless and bulb-free sub-housing 124 is illustrated. A first array of one or more light emitting diodes (LEDs) 126 may be contained within sub-housing 124 and is selectively operated upon receipt of a signal occurring in the absence of ambient light, thereby operating as an emergency/night light. A second array of one or more light emitting diodes 128 may be contained within sub-housing 124 and is operated upon receipt of a DC signal converted from an AC power supply as a solid state lighting source. One of the two end caps 130 are positioned at one of the two ends 132 or 134 of the light unit 110. Prongs 136 are integral to each end cap 130 and facilitate electrical communication with a mating female socket within a light housing 120 (as shown in FIG. 23, for example). The elongated nature of the sub-housing 124, in one embodiment perhaps coextensive with a conventional fluorescent tube, makes the present light unit 110 a suitable and fit replacement insert for a conventional fluorescent tube assembly within a conventional troffer. Battery compartments 140 may be positioned on one or more ends of the light unit 110 for placement of a battery source therein.

Figure 13:
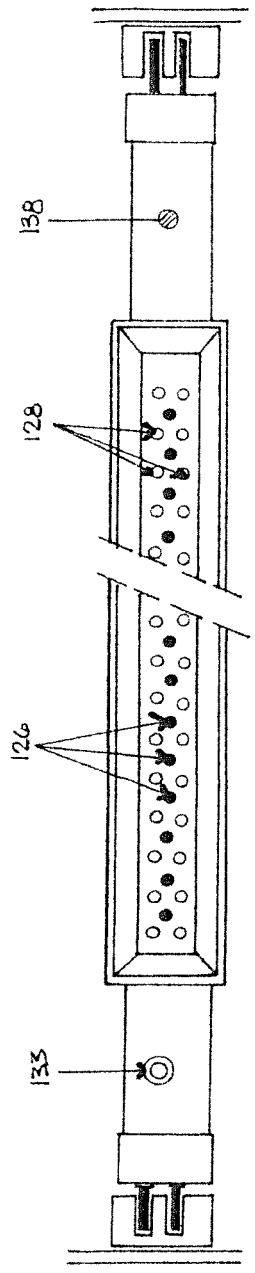
FIG. 13 is a top view of another embodiment similar to the embodiment of FIG. 11, with fewer LED lights.
Figure 14:
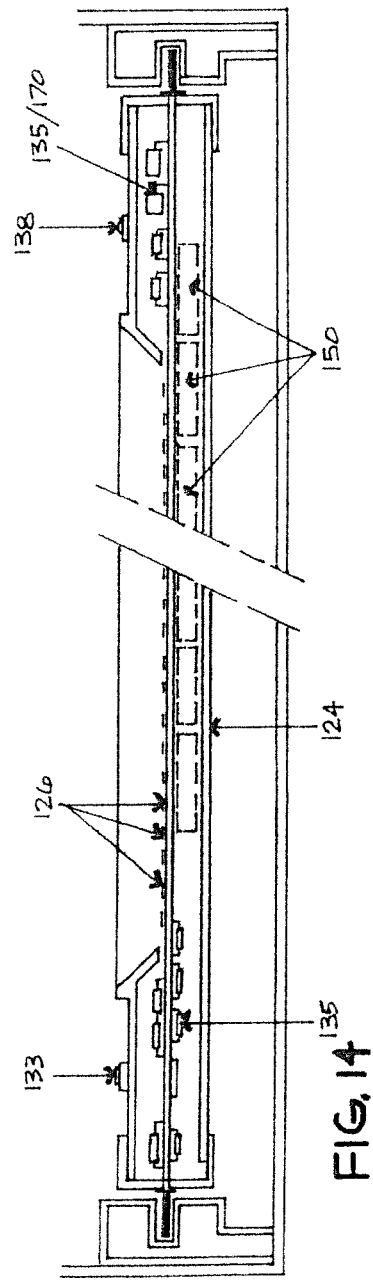
FIG. 14 is a side view of the embodiment of FIG. 13, illustrating placement of the batteries.
Figure 15:
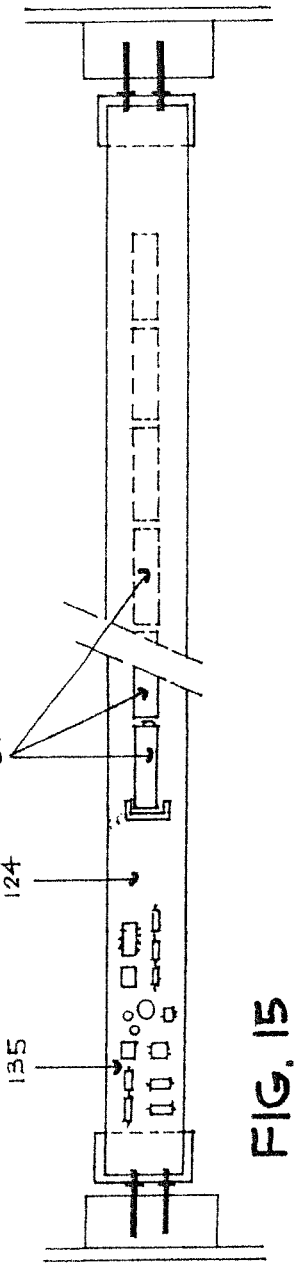
FIG. 15 is a bottom view of the embodiment of FIG. 13.
Figure 22:
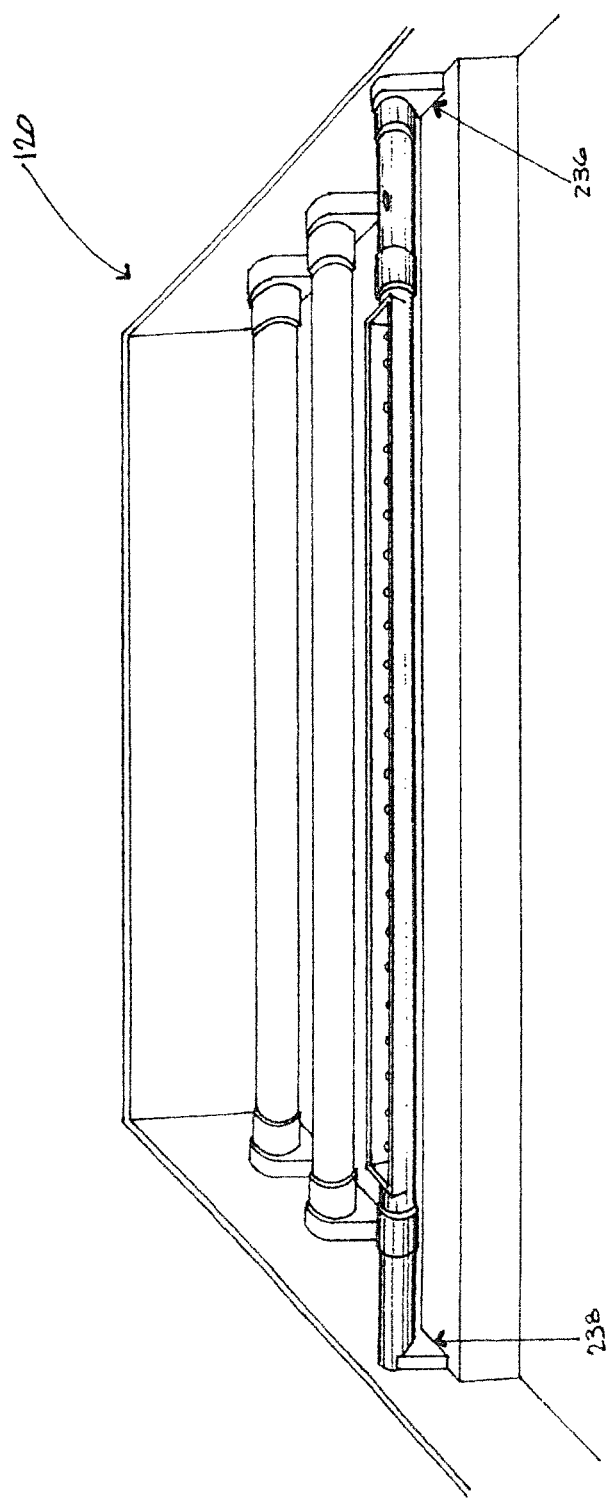
FIG. 22 illustrates the installation of the light assembly of FIG. 20 within a troffer or housing.
Figure 27:
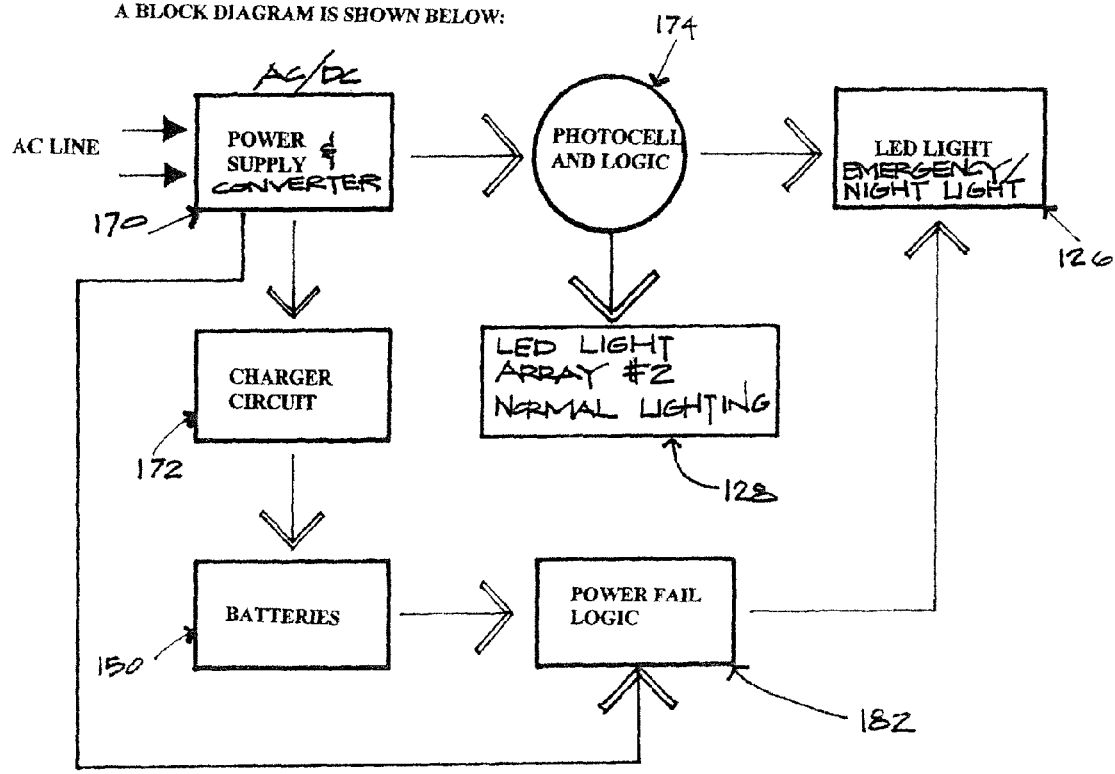
FIG. 27 illustrates a schematic of the circuitry of the embodiments of FIGS. 11-26.

As shown in yet another embodiment in. FIGS. 13, 14, and 15, a circuit board 135 is contained within sub-housing 124 and provides circuitry (a rectifier for example) to convert an incoming 110 VAC to 12-15 VDC. A photocell 138 may be provided within the sub-housing 124, and as explained below relative to FIG. 27, operably communicates with the first LED array 126 to provide DC power in the absence of ambient light, and if desired, from the absence of the primary light source provided by LED array 128. As shown in FIG. 27, an AC power sensor 140 may be connected to an output of the AC/DC power supply and to an output of the battery source 150. In the event of a loss of AC power, the AC power sensor 140 senses the loss of energy and switches the light unit 110 to DC power from the batteries. The DC power from the batteries is thereby routed to the photocell 138 and therefore provides power to the first LED array 126 in the absence of ambient light, during an emergency situation for example.

A test control 133 may be coupled to the first LED array 126 and is useful for service tests to comply with regulatory requirements on periodic testing of emergency service equipment. As shown in FIGS. 14 and 15, batteries 150 may be housed within sub-housing 124 in a linear fashion, and adjacent LED arrays 126 and 128.

An AC/DC power supply/converter 170 is schematically shown in FIG. 27 and is provided to supply direct current power to the first LED array 126. Converter 170 may, but not by way of limitation, be provided by V-Infinity of Oregon as identified as part number FSC-S15-15U, for example. It will be appreciated that other sources of alternating current may also be rectified or converted to appropriate amounts of direct current depending on design criteria. For example, 220 VAC could also be rectified to 15 VDC if desired.

As also schematically shown in FIG. 27, converter 170 may operably and electronically communicate with battery source charger 172 and to a photocell 174, thereby providing direct current power to each. Alternatively, a rectifier may instead be provided rather than the converter 170, so long as direct current power ultimately is provided in appropriate and operable amounts to the charger 172 and the LED arrays 126 and 128. Charger 172 may electronically or operably communicate with one or more batteries 150 to maintain a charge to the rechargeable batteries 150. In the event of power failure, direct current by and through photocell 174 is interrupted due to the absence of alternating current being supplied to direct current power supply 170. Accordingly, in the event of power failure, direct current is provided from the batteries 150 to first LED array 126. As shown in FIG. 27, a power sensor 182 normally communicates with a signal from the power supply 170, thereby confirming the existence of AC power. In the event of an interruption in the power supply 170, the power sensor 182 switches to battery power from the battery source 150, thereby providing DC power in an emergency situation. The battery current is directed to the photocell 174 and provides power to first LED array 126 thereby providing emergency lighting in the absence of ambient light. As with the embodiments of FIGS. 1-10, the batteries may be disposable thereby obviating the need for a battery charger within the circuitry.

Referring to FIGS. 11 through 15, batteries 150 may also be provided at opposite ends of the light unit 110 thereby providing emergency lighting to the LED array 126 in the event of a power outage. Contacts 155 may be seated within female receptacles within a light assembly such as shown in FIG. 23. As shown in FIG. 12, the batteries 150 may be placed within storage compartments 154. The compartments 154 may then be rotatably or otherwise fixed in electronic contact with each end of the LED array 126, thereby providing a direct current power supply in the event of an absence of power from the alternating current supply. Although not shown, it will be appreciated that equivalent circuitry as described by FIG. 10 and as shown in FIGS. 5 and 6 as circuit board 35 are provided in light unit 110 thereby converting or rectifying alternating current to direct current in the same way as described relative to FIG. 10.

Referring to FIG. 16, a sub-housing 124 may be shaped as a bulb-free and partial tube, so that the LED array 128, operable during normal operating conditions, is exposed to the ambient and open environment of the housing 120, thereby presenting a heat management advantage. The embodiment shown in FIG. 16 may contain end caps and prongs as shown in FIGS. 11 and 12, thereby providing a ready replacement for conventional fluorescent tubes for example. The LED array 128 may communicate with an AC/DC power supply 170 (not shown), and may operate with or without the additional night light first LED array 126. The circuitry may contain a rectifier 170 for converting AC power to DC power and omit any batteries for emergency use. Additionally, if desired, an LED array 126 may still be used to supply night lighting and as described relative to FIGS. 11 and 12, whereby the array 126 is illuminated as photo-sensor 184 is actuated upon the absence of light. As stated above, the LED array 126 is selectively illuminated by the photo-sensor 184 in lieu of the LED array 128, which operates during normal operating conditions during the day. In this embodiment, the circuitry may be provided as known in the art. U.S. Pat. No. 7,049,761, herein incorporated by reference in its entirety, exemplifies certain circuitry that may be useful in the present invention.

Referring to FIG. 17, the backside of the embodiment illustrated in FIGS. 13-15 is shown whereby a door panel 188 provides an access to replace batteries 150 as needed.

Yet another embodiment of FIG. 18 illustrates how a lighting unit 110 of FIGS. 1 and 2 can be inserted within a troffer or housing 120. Cross-sections are also shown taken along the line A'-A'. In a first cross-section C, the illumination of the LEDs is unconstrained and radiates in an arc approximating 180 degrees. In a second cross-section D, optional adjustable reflectors 190 are fixed or positioned on the sub-housing 124 to form a desired angular relationship from the sides 192 of the sub-housing 124 of the cross-section D, thereby directing more lighting to areas below the lighting unit 110. As shown in FIG. 18, in one embodiment, the sub-housing 124 is slidably engaged within female mounts 194 as prongs 136 interface and electrically communicate with electrical contacts 196 within the mounts 194.

Yet another embodiment of FIGS. 19-22 illustrates a one-endcap embodiment of the present invention. An end cap 230 is fixed at one end of the sub-housing 224. A set of prongs 239 is fixed within the end cap 230 and electrically communicates with a female socket 236 for receipt of AC energy within the lighting unit 210. As shown in the drawings, the embodiment is substantially similar to the embodiments of FIGS. 1 and 2 with the exception that the batteries 250 on each end of the sub-housing 224 are powered or charged by electrical communication from only one endcap 230. The electrical circuit loops through the LED arrays 226 and 228 to provide the same functional relationship, night light/emergency lighting and conventional lighting, respectively, as in the embodiment of FIGS. 11 and 12. U.S. Pat. No. 6,936,968, herein incorporated by reference in its entirety, exemplifies but does not limit the various circuitries that could be employed to accommodate the one-endcap system. As shown in the FIGURES, the sub-housing is supported by the socket 236 and a mounting bracket 238 at an opposite end of the sub-housing having no end cap 230, for support of the end having no end cap.

Figure 24:
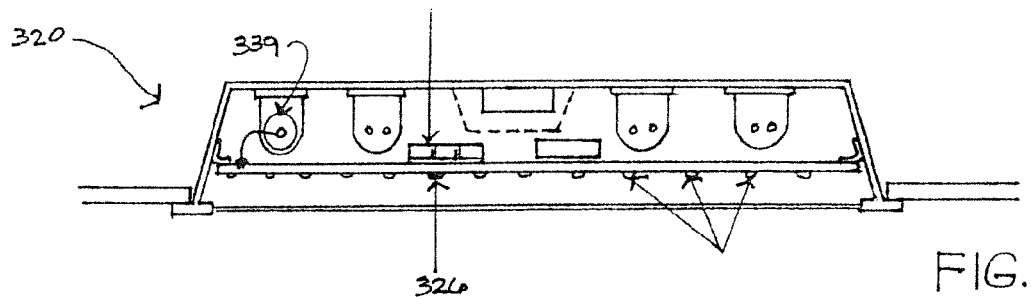
FIG. 24 illustrates a side view of the light unit of FIG. 23.
Figure 25:
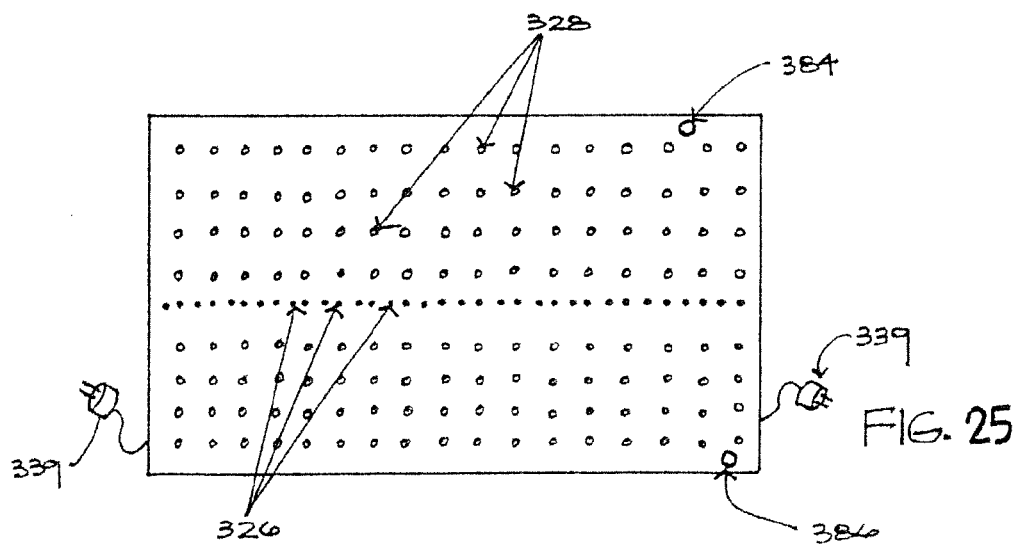
FIG. 25 illustrates a top view of the panel of FIG. 23.
Figure 26:
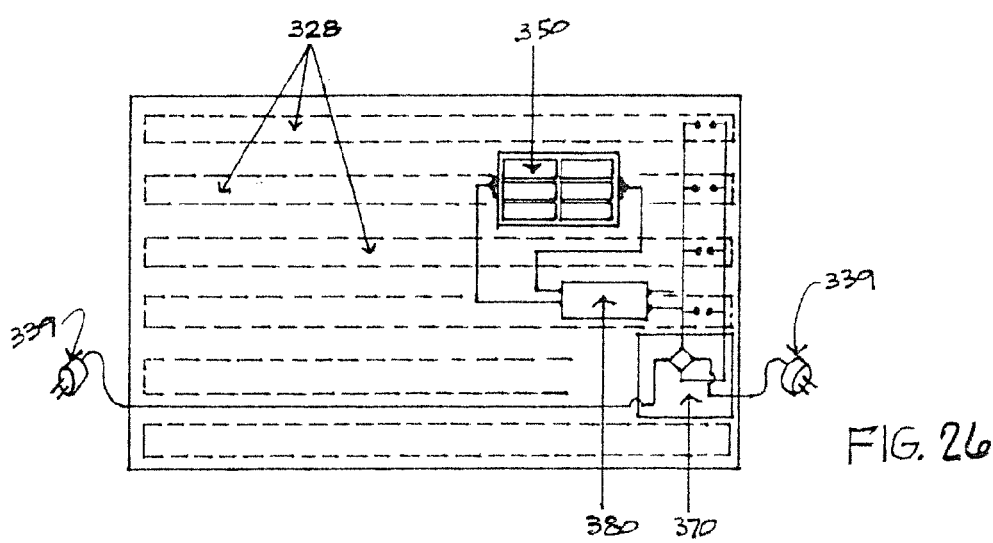
FIG. 26 illustrates a bottom view of the schematic wiring of the panel of FIG. 23.

FIGS. 23-26 illustrate an embodiment that provides a modular concept of the present invention. As shown in FIG. 23, a plurality of LED arrays/strips 328 are fixed to a panel or sub-housing 340 and electronically communicate with two female sockets 336 by seating two conductive plugs or two sets of prongs 339 electrically communicating with the set of LED arrays 328. As shown in FIG. 24, the panel 340 is seated within the troffer 320 and may be used to replace and retrofit current fluorescent tube troffers now in service. As shown in FIG. 25, a plurality of LED arrays 328 is used to provide conventional lighting during normal hours of operation. At least one first LED array/strip 326 is used to provide night lighting and if desired, emergency lighting, in accordance with the present invention. As shown in FIG. 26, the plurality of LED arrays 328 and the first LED array 326 are wired on the backside of the panel 340 in accordance with the block diagram presented in FIG. 27. The circuitry shown in FIG. 26 contains a battery source 350, a rectifier/converter 370, a battery charger 380 if desired, a photo-sensor 384, and an AC sensor 386, wired and configured as shown in FIG. 27. As with other embodiments, the battery charger 380 may be omitted from the circuitry if disposable batteries are used.

Figure 28:
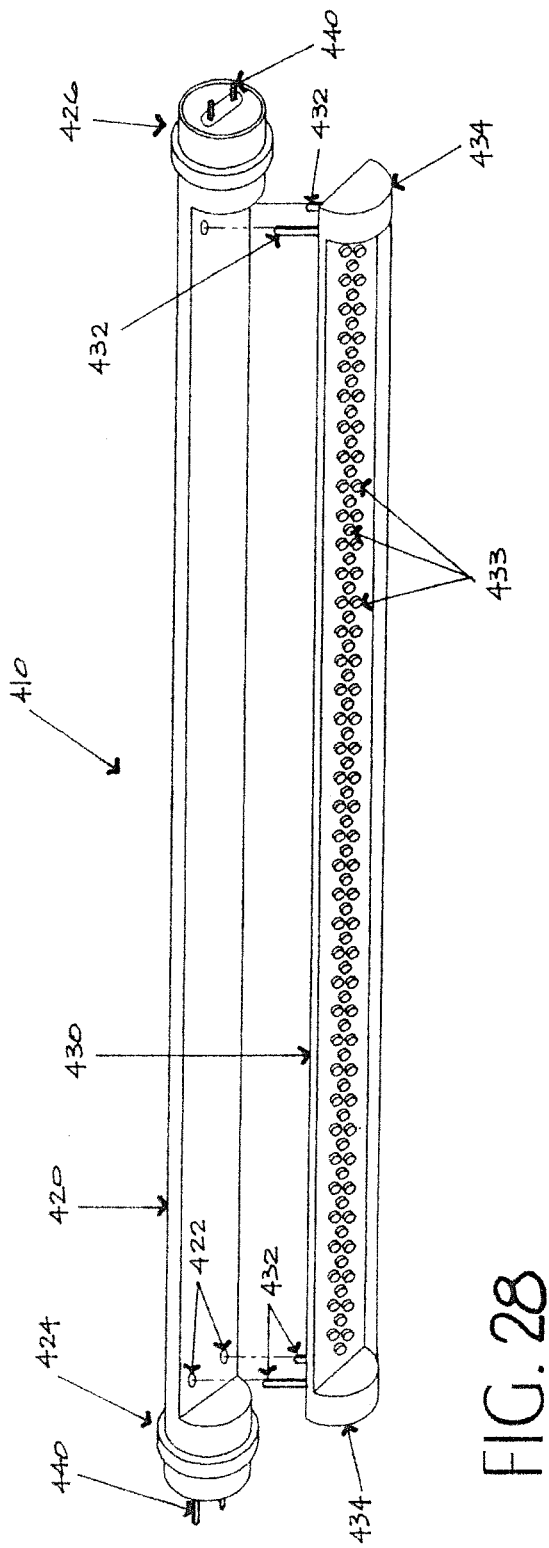
FIG. 28 illustrates a perspective and schematic view of a replacement light assembly for a fluorescent tube troffer, the assembly containing an AC-DC converter and other desired circuitry within a housing insert for a troffer, and further containing a modular LED insert for insertion within a housing insert.
Figure 29:
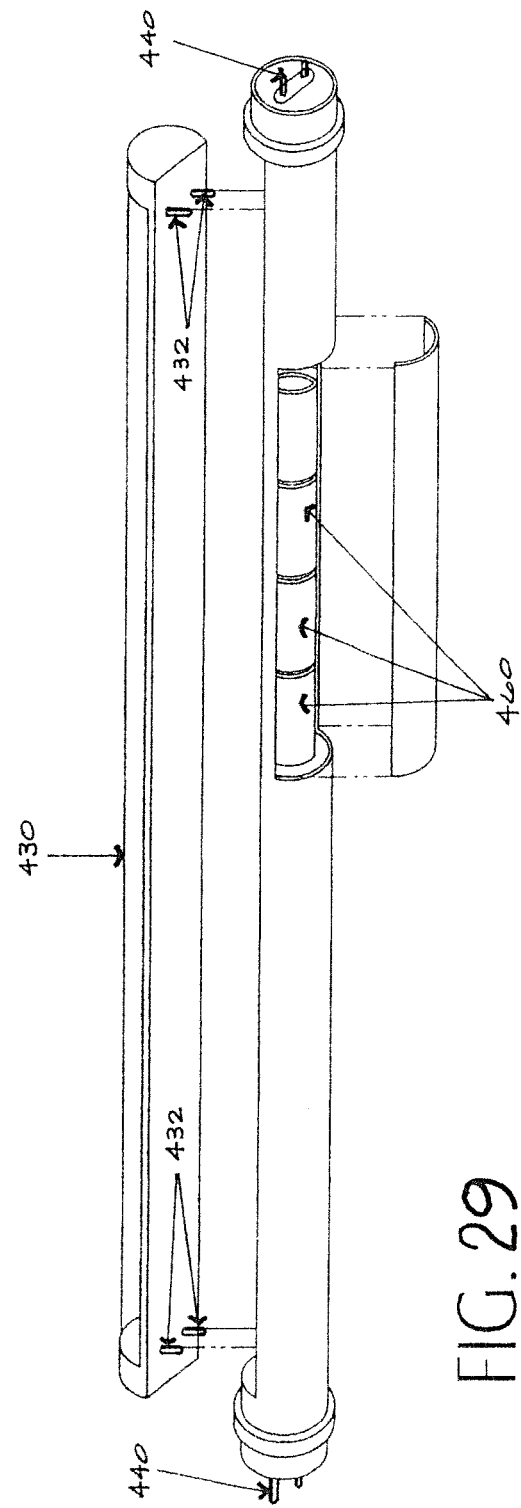
FIG. 29 illustrates a perspective view of the back side of the embodiment of FIG. 28 wherein a battery source compartment and batteries are schematically illustrated.
Figure 30:
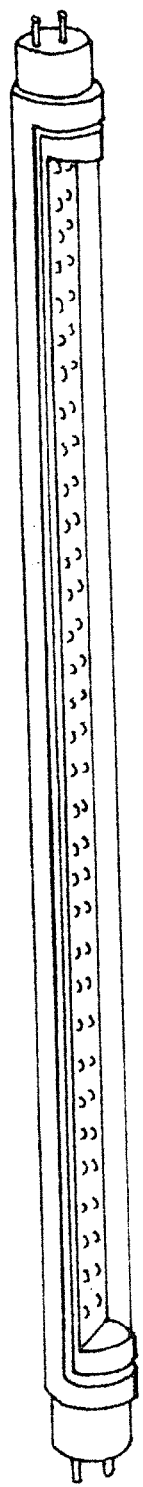
FIG. 30 illustrates a perspective view of the embodiment of FIG. 28 illustrating the insertion of the modular LED insert within the housing insert.
Figure 35:
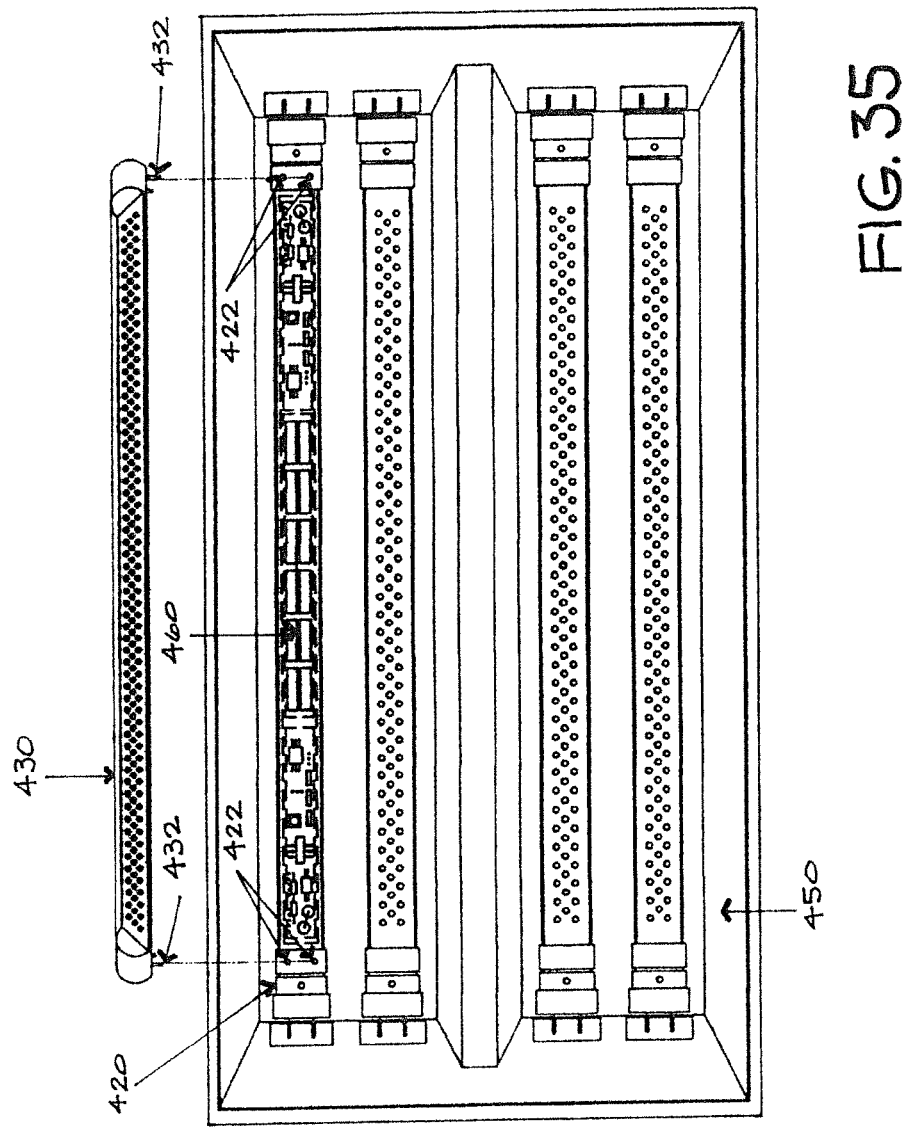
FIG. 35 schematically illustrates placement of one or more of housing inserts of FIGS. 34*a* through 34*c* within a troffer light fixture designed for fluorescent tubes.
Figure 36:
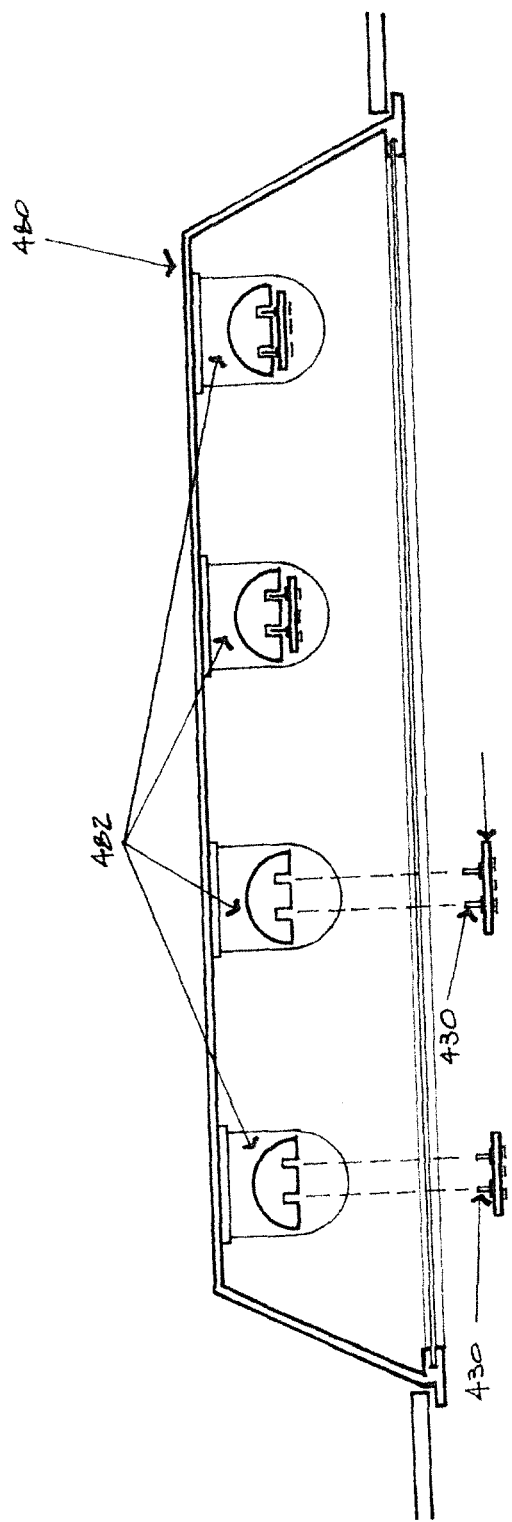
FIG. 36 schematically illustrates a side view of the fluorescent tube troffer of FIG. 35.
Figure 37:
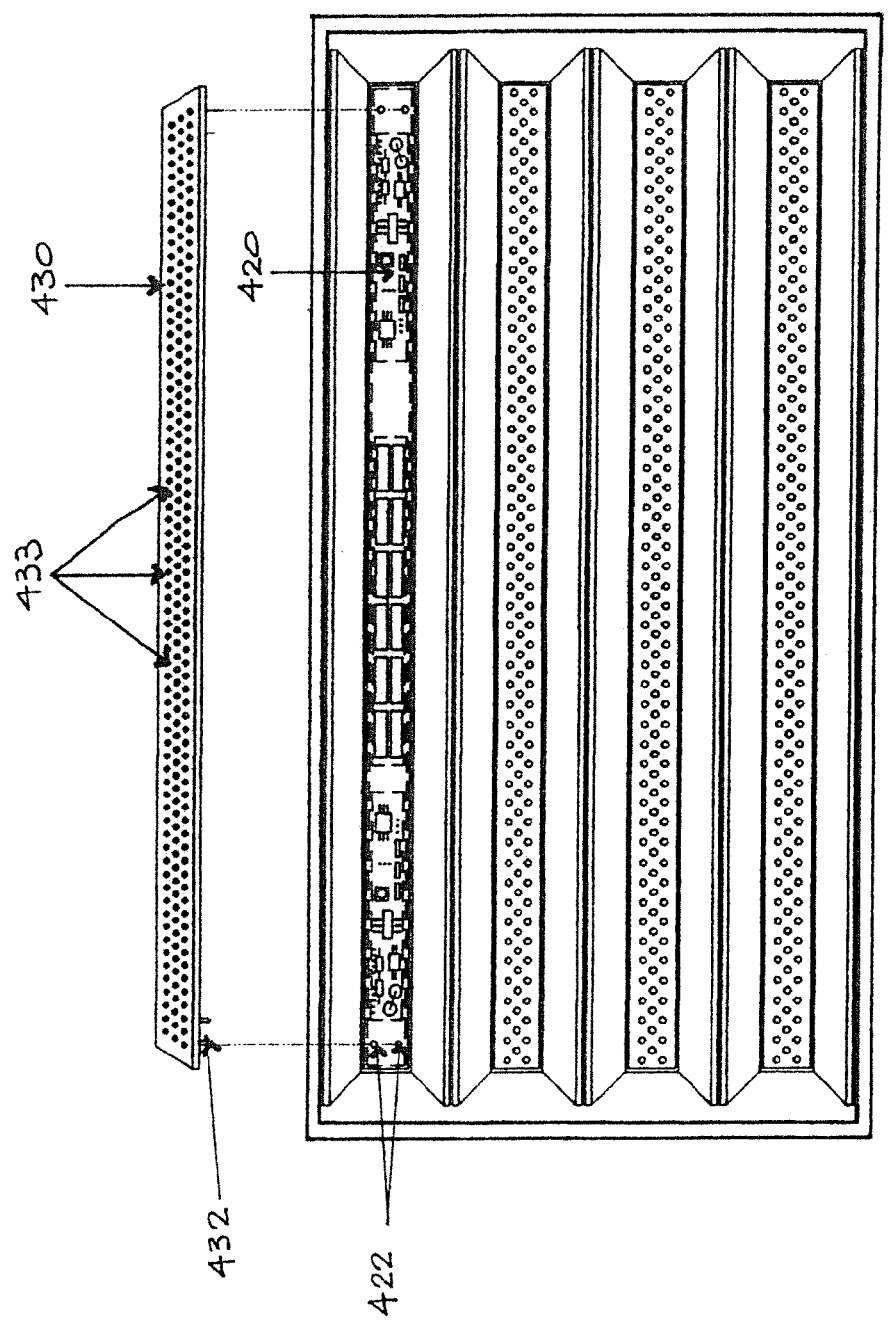
FIG. 37 schematically illustrates placement of one or more of housing inserts of FIGS. 34*g* through 34*i* within a troffer light fixture designed for fluorescent tubes.
Figure 38:
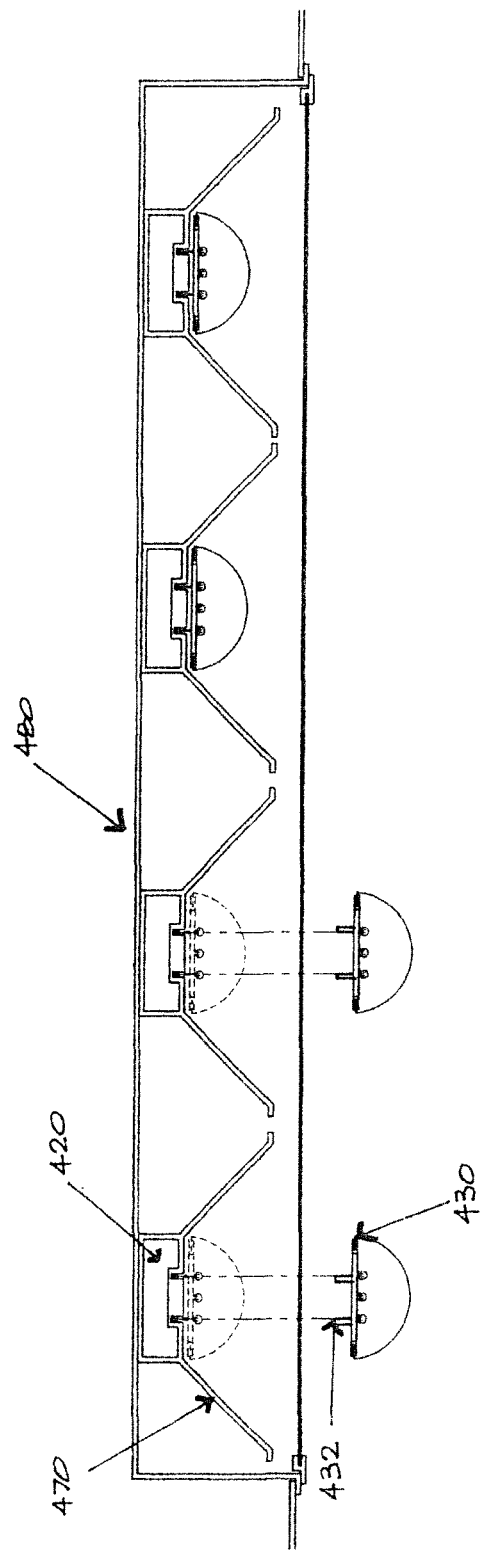
FIG. 38 schematically illustrates a side view of the fluorescent tube troffer of FIG. 37.
Figure 39A:
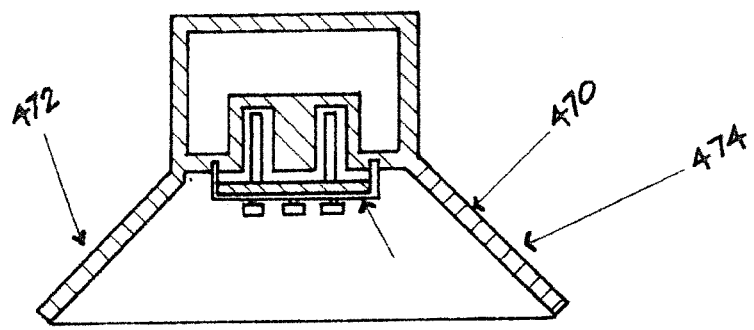
FIG. 39*a* schematically illustrates one embodiment with a rectangular cross-section, the light assembly containing a first exemplary angular position of a light deflector with one type of bulb-less LED insert.
Figure 39B:
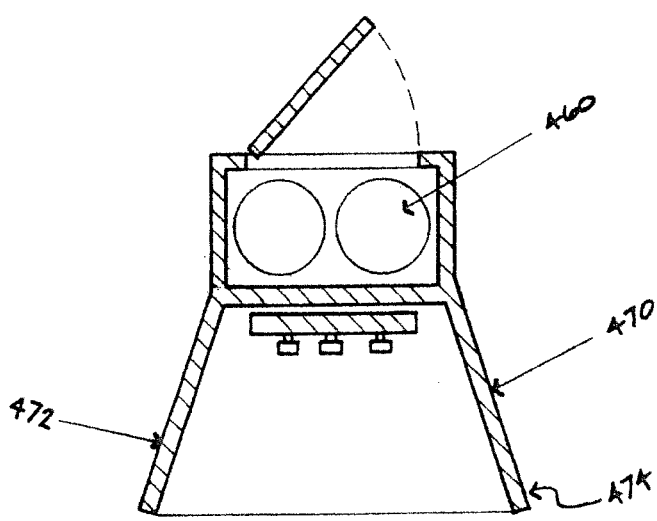
FIG. 39*b* schematically illustrates yet another embodiment with a rectangular cross-section, the light assembly containing a second exemplary angular position of a light deflector with yet another type of bulb-less LED insert, and a battery source and an access panel.
Figure 39C:
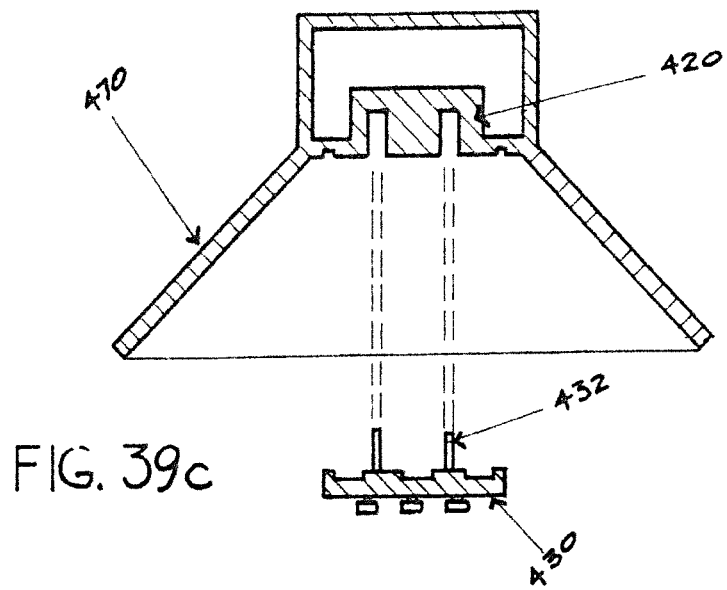
FIG. 39*c* schematically illustrates the embodiment of FIG. 39*a* showing the removability of the LED insert.
Figure 39D:
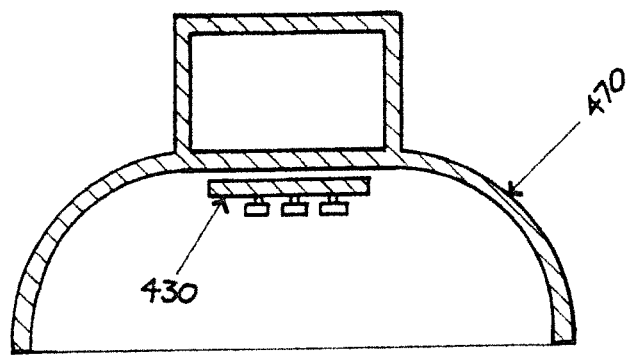
FIG. 39*d* schematically illustrates yet another embodiment with a rectangular cross-section, the light assembly containing a third exemplary angular position of a light deflector having a curved reflective surface, with one type of bulb-less LED insert.

In yet another aspect of the invention, FIG. 28 exemplifies yet another replacement light assembly 410 for a fluorescent tube troffer, the assembly containing an AC-DC converter (schematically represented, but not specifically shown) and other desired circuitry (schematically represented but not specifically shown) within a housing insert 420 for a troffer, and further containing a modular LED insert 430 for insertion within the housing insert 420. The modular LED insert 430 may be fitted with at least one pair of conductive plugs or prongs 432 preferably at one or more ends 434 and 436. In general, the LED insert module 430 contains one or more light emitting diodes 433. One or more pairs of complementary female sockets 422 within the housing insert 420, are preferably formed at one or both ends 424, 426 of the housing insert 420. When assembled, each respective pair of conductive plugs or prongs 432 are slidably, pressed-fit, or otherwise conductively engaged with a respective pair of female sockets 422. Once the modular LED insert or module is seated within the housing insert as shown in FIGS. 30, 33, 34*b*, 34*c*, 34*e*, 34*f*, 34*h*, 34*i*, 36, 38, 39*a*, 39*b*, and 39*d*, the resultant light assembly by virtue of the troffer prongs 440 on at least one end 424/426 of the housing insert 420, may be inserted within a known troffer light fixture 450 or 480 for fluorescent light tubes as shown in FIGS. 35 and 37.

As shown in FIGS. 40 and 41, the LED module 430 may be slidably engaged to housing insert 420. As shown in FIG. 40, the prongs 432 may horizontally engage the female sockets 422 thereby providing direct current voltage from the housing insert 420 which as explained below, in turn receives and converts alternating current voltage provided by the troffer or light fixture. A snap-fit or securing member 437 is provided on the LED module end 436 for removably securing the LED module 430 to the housing insert 420. As such, a corresponding aperture 427 is formed proximate the end 426 of the housing insert 420, for receipt of the securing member 437. In this way, the LED module 430 is removably seated or secured to the housing insert 420.

As with other embodiments of the present invention, and as shown in FIGS. 29, 33, 34*c*, 34*f*, 34*i*, and 35, a battery source 460 containing one or more batteries may be provided in modular lighting assemblies 410 to provide emergency power in the event of power loss. Furthermore, as with other embodiments, in the present modular LED light assemblies, photo resistors or light sensors may be employed to provide night lighting function in the absence of light. In accordance with this aspect of the invention, the housing insert 420 contains any desired circuitry including rectifier or converter circuitry, battery circuitry, and night light and emergency light circuitry as discussed with regard to other embodiments of the invention described in FIGS. 1-27. The LED insert 430 contains electrical prongs 432 that are made from conductive materials that are known in the art. These materials may include steel, copper, or other metallic conductors for example.

Figure 31:
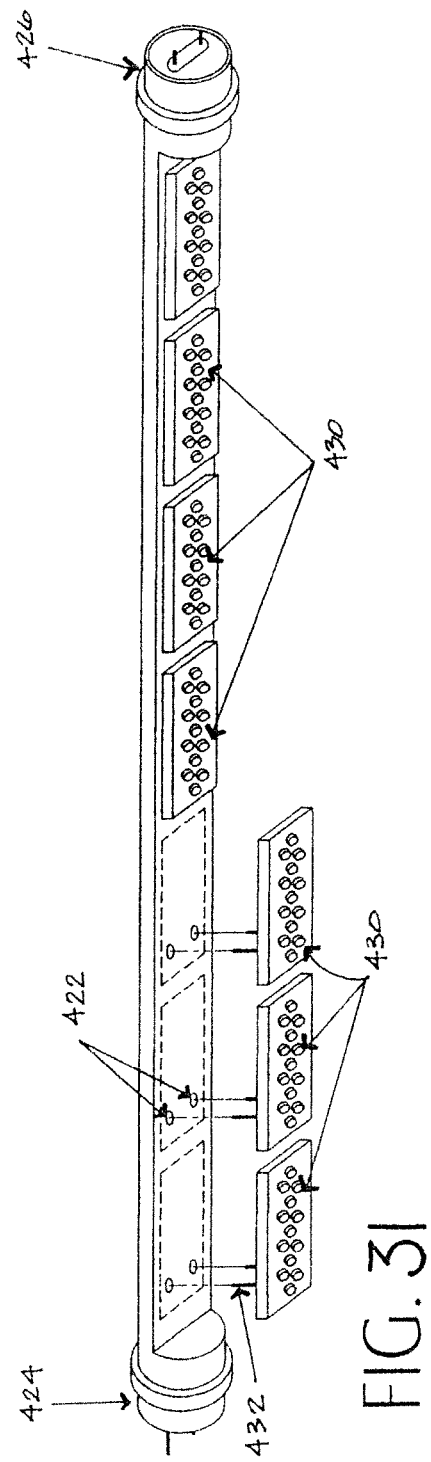
FIG. 31 illustrates a perspective view of yet another embodiment showing a plurality of modular LED inserts within a housing insert for a troffer, and may be connected in series with each other and with the end caps of the housing insert.
Figure 34A:
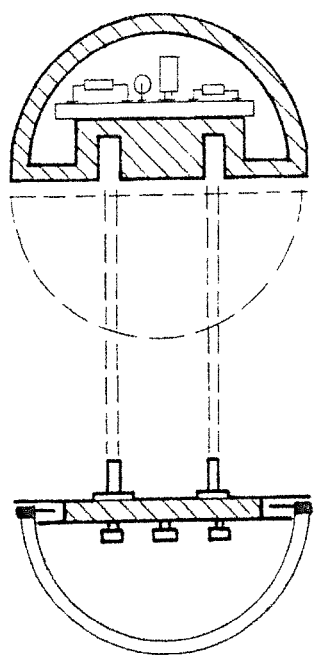
FIG. 34*a* schematically illustrates one embodiment having a semi-circular modular LED insert for insertion into a housing insert.
Figure 34:
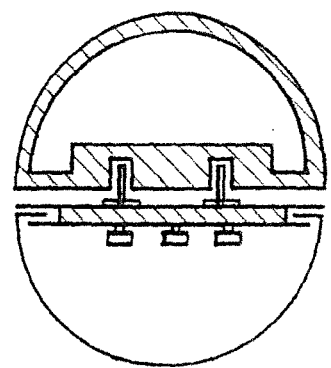
FIG. 34*b* illustrates the embodiment of FIG. 34*a* having the LED insert fixed within the housing insert.
FIG. 34*c* schematically illustrates an embodiment similar to that of FIG. 34*a* containing a battery source and a removable access panel for access to the battery source.
FIG. 34*d* schematically illustrates one embodiment having a semi-circular modular LED insert for insertion into a housing insert, the embodiment further containing a light deflector extending from the housing insert.
FIG. 34*e* schematically illustrates the embodiment of FIG. 34*d* having the LED insert fixed within the housing insert.
FIG. 34*f* schematically illustrates an embodiment similar to that of FIG. 34*d* containing a battery source and a removable access panel for access to the battery source.
FIG. 34*g* schematically illustrates one embodiment having a bulb-less modular LED insert for insertion into a housing insert, the embodiment further containing a light deflector extending from the housing insert.
FIG. 34*h* schematically illustrates the embodiment of FIG. 34*g* having the bulb-less LED insert fixed within the housing insert.
FIG. 34*i* schematically illustrates an embodiment similar to that of FIG. 34*g* containing a battery source and a removable access panel for access to the battery source.
Figure 34C:
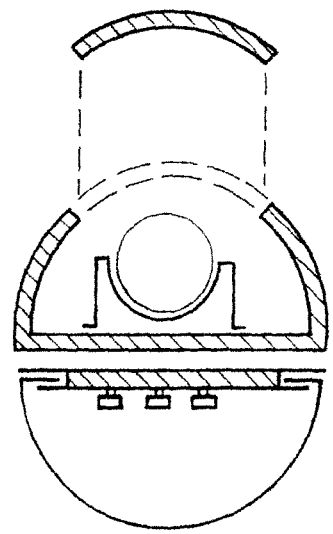
Figure 34:
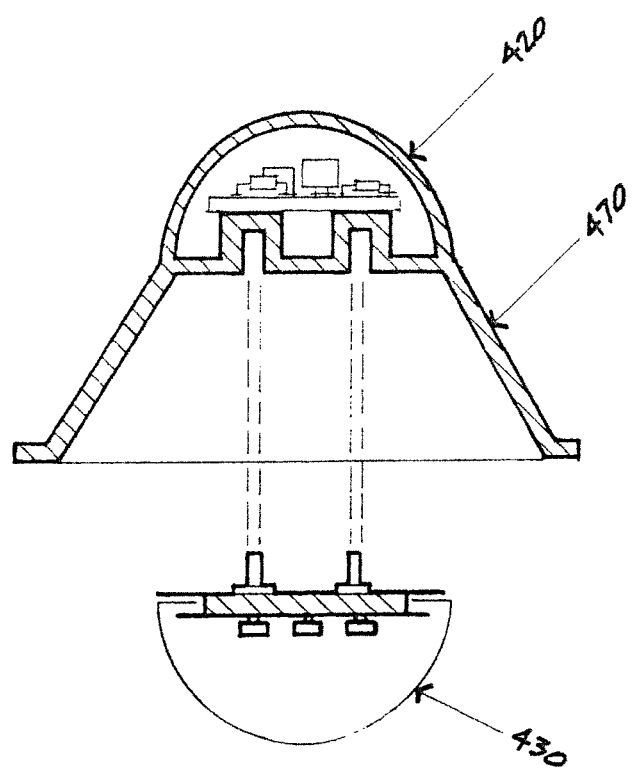
Figure 34E:
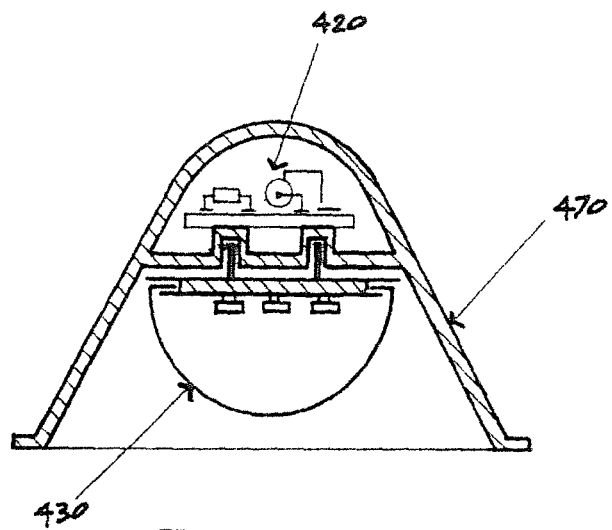
Figure 34F:
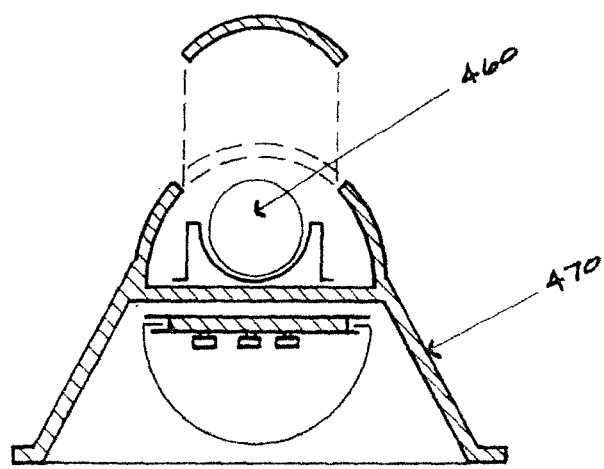
Figure 34:
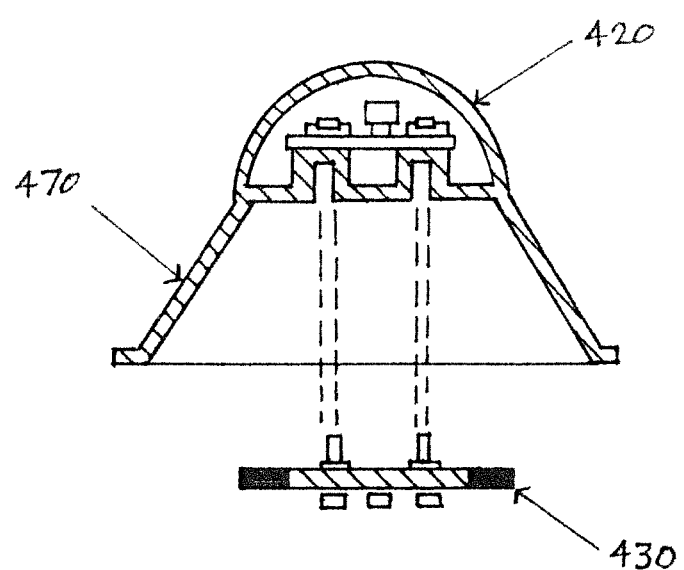
Figure 34:
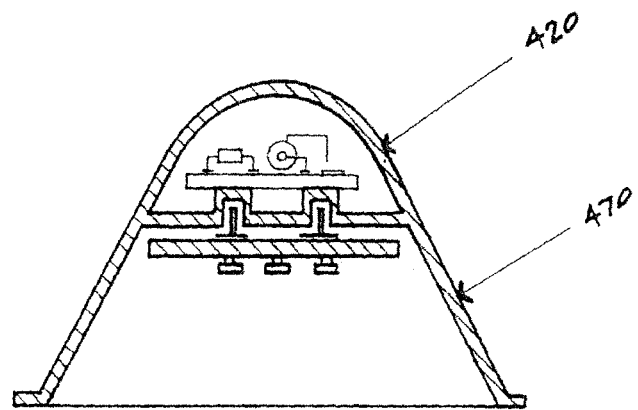
Figure 34:
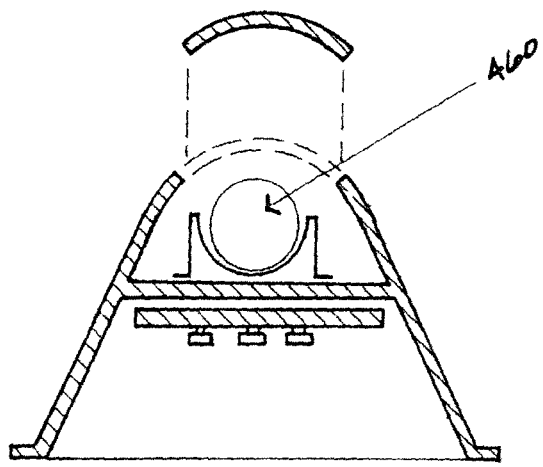

In keeping with the modular concept, and as exemplified in FIGS. 28 and 31 for example only, one or more modular LED light strips or sub-modules 430 may be employed in the housing insert 420 and modular lighting assemblies 410 of the present invention. In further keeping with the modular concept, it will be appreciated that modular lighting assemblies may be provided with LED arrays covered by bulbs, as shown in FIGS. 28, 29, 30, 32, 33, 34*a* through 34*f*, or, if desired, with one or more bulb-less modular LED light strips or modules such as those shown in FIGS. 31, 34*g* through 34*i*, 37, 38, 39*a* through 39*d*, 40, 41, 42, and 43*a* through 43*c*. The LED light strips and/or sub-modules 430 may be assembled in a known manner wherein the light emitting diodes 435 are electrically connected to each other, in series or parallel, for example, thereby conducting the electric potential provided by the prongs 432 when mated with the female sockets 422. As shown in FIG. 31, a plurality of sub-modules 430 may be provided with corresponding prongs 432 provided on each sub module 430. As also shown in FIG. 31, for each set of prongs 432 provided in each sub-module 430, a corresponding plug or female conductive receptacle 422 is formed in the housing insert 420 for receipt of the corresponding pair of prongs 432. Accordingly, a plurality of sub-modules 430 may be seated in a corresponding number of plugs 422, thereby providing electrical communication with an electrical conductor (not shown) running the length of the housing insert 420.

Yet another aspect of the invention includes the packaging advantage provided by designing the light assemblies in rectangular or other geometric cross-sections as shown in FIGS. 39*a* through 39*d*, for example. Further to the packaging advantage, and as shown in the FIGURES, the modular LED light strips 430 may be designed as semi-cylindrical bulbs or bulb-less flat strip geometry, for example.

Figure 44:
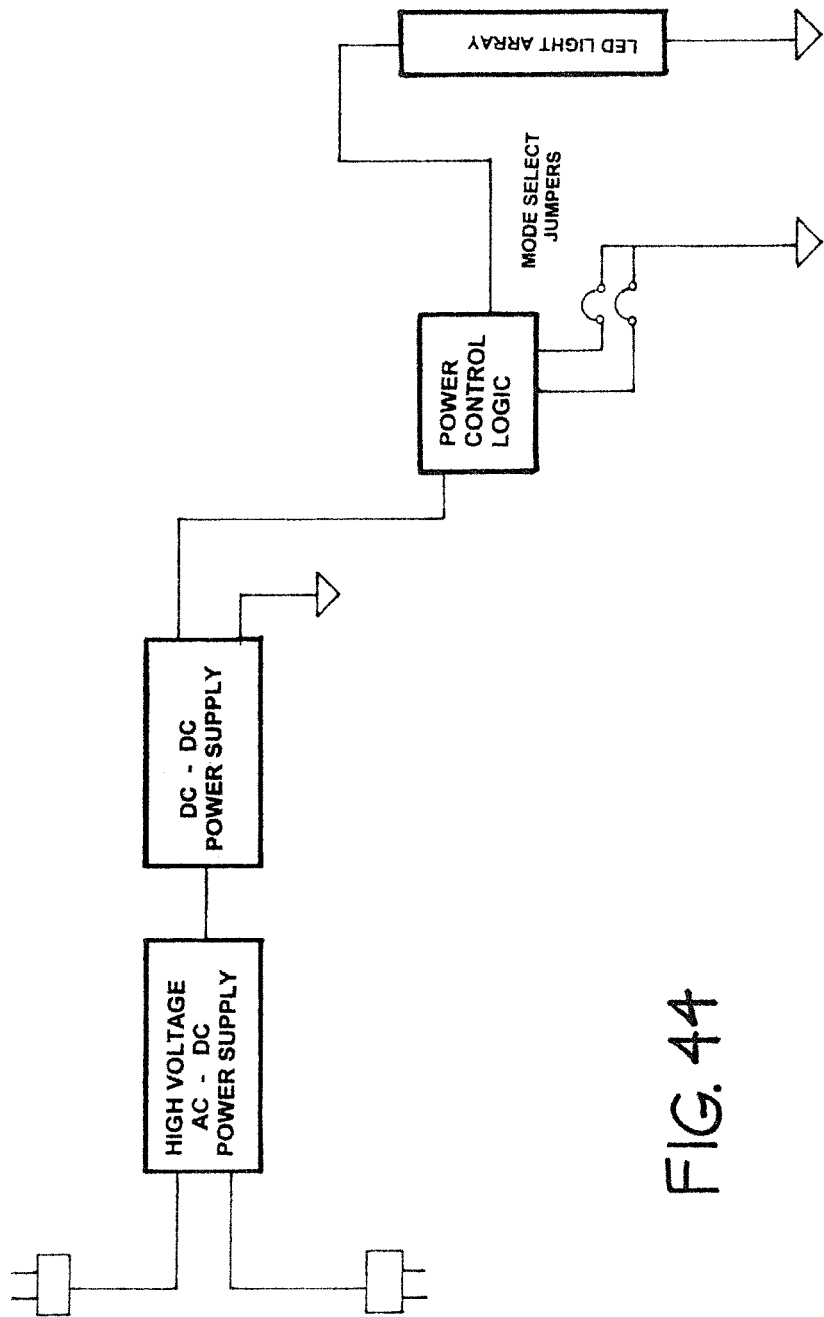
FIG. 44 illustrates yet another flow chart exemplifying one electronic configuration for providing power to light assemblies of the present invention, those in FIGS. 28 through 40, for example.
Figure 45:
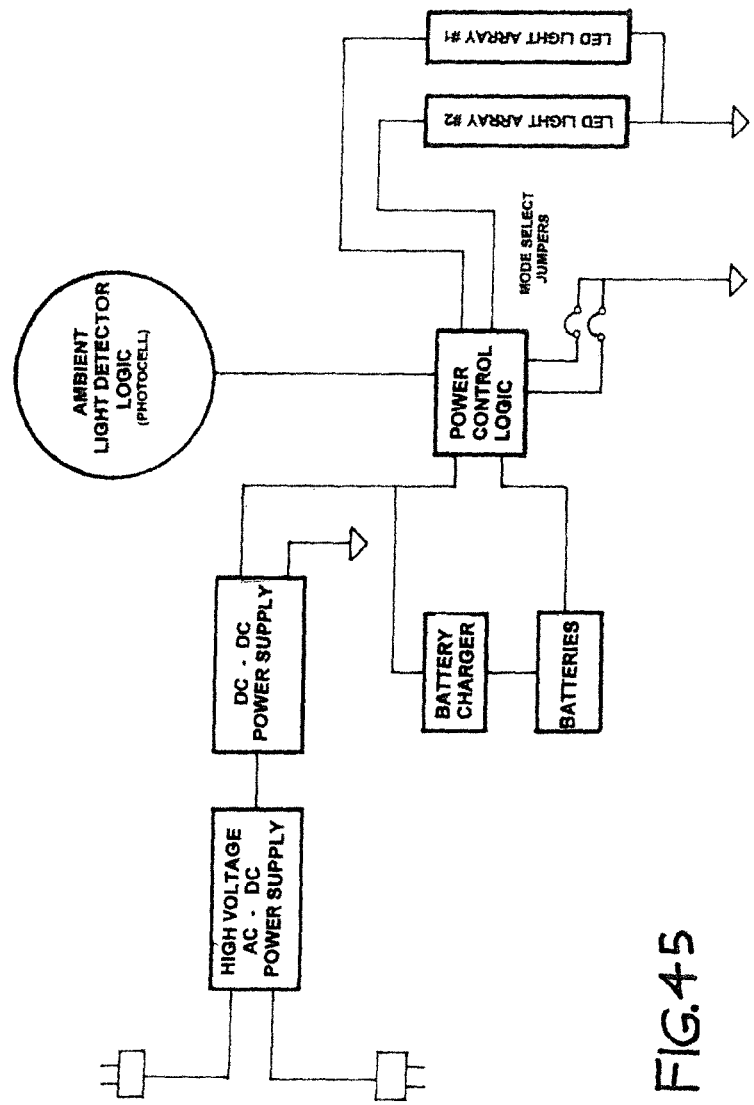
FIG. 45 illustrates yet another flow chart exemplifying yet another electronic configuration for providing normal power and emergency power, and night light sensing, to modular LED light strip assemblies as described in FIGS. 28 through 40 for example.

The modular LED light assemblies of FIGS. 28-40 may be electronically configured as shown in FIG. 44 or 45, for example. Alternatively, or in conjunction with the designs shown in FIGS. 1-40, power may be supplied to the light assemblies 410 as known in the art. For example, U.S. Pat. Nos. 7,815,338, 7,712,918, 7,510,299, and 7,049,761, incorporated herein by reference, exemplify various electronic configurations that may be employed in the contexts of the present invention.

In operation and in accordance with the present invention, alternating current power is provided to a troffer or light fixture 480. One or more light assemblies 410 are adapted to electronically communicate with at least one or more respective pairs of opposed sockets 482. One pair of light fixture sockets 482 correspond to each light assembly 410 that is installed within the troffer 480. A pair of housing insert prongs 440 are provided on each end 424 and 426 of the housing insert 420, whereby each pair of prongs 440 electronically communicates with a corresponding socket within a pair of opposed troffer sockets 482. The housing insert 420 contains all necessary rectifier and/or converter circuitry (described above with regard to FIGS. 1-10 for example) to convert the alternating current provided through prongs 440 into direct current, to be used by one or more LED arrays or insert modules 430. Other optional circuitry relative to this embodiment includes the night light and emergency light circuitry and battery sources described in other embodiments herein. This various circuitry is explicitly and/or schematically presented in FIGS. 1-40, and more particularly, with regard to this embodiment, in FIGS. 28-40. The LED insert module(s) are therefore powered by direct current entering through prongs or plugs 432 when connected to female plugs 422 within housing insert 420. Stated another way, LED insert module(s) are adapted to electronically communicate with the circuitry of housing insert 420 as prongs 432 are seated within female receptacles 422. It will be appreciated that the circuitry described with regard to the other embodiments of the specification, including those in FIGS. 1-10 illustrating night light and emergency light configurations may also be employed in the embodiments shown in FIGS. 28-40.

Yet another aspect of the present invention includes the more efficient use of LED light as it is transmitted from the lighting assembly to the underlying area to be illuminated. Accordingly, a light deflector 470 attached to a lighting assembly 410 formed in accordance with any aspect of the present invention is provided. As shown in FIGS. 34*d* through 34*i*, 37, 38, and 39*a* through 39*d*, a light deflector 470 may be substantially coextensive with the length of the light assembly or modular light assembly 410, and may comprise a first deflector panel 472 and a second deflector panel 474.

It will be appreciated that by tailoring the angular displacement of the deflector panels of the deflector or shroud, the light may be focused more intensely to underlying areas as desired. As a result, more efficient use of the LED lighting is facilitated, thereby reducing the overall energy required to provide adequate lighting, as compared to state of the art LED tubes, for example.

Figure 50:
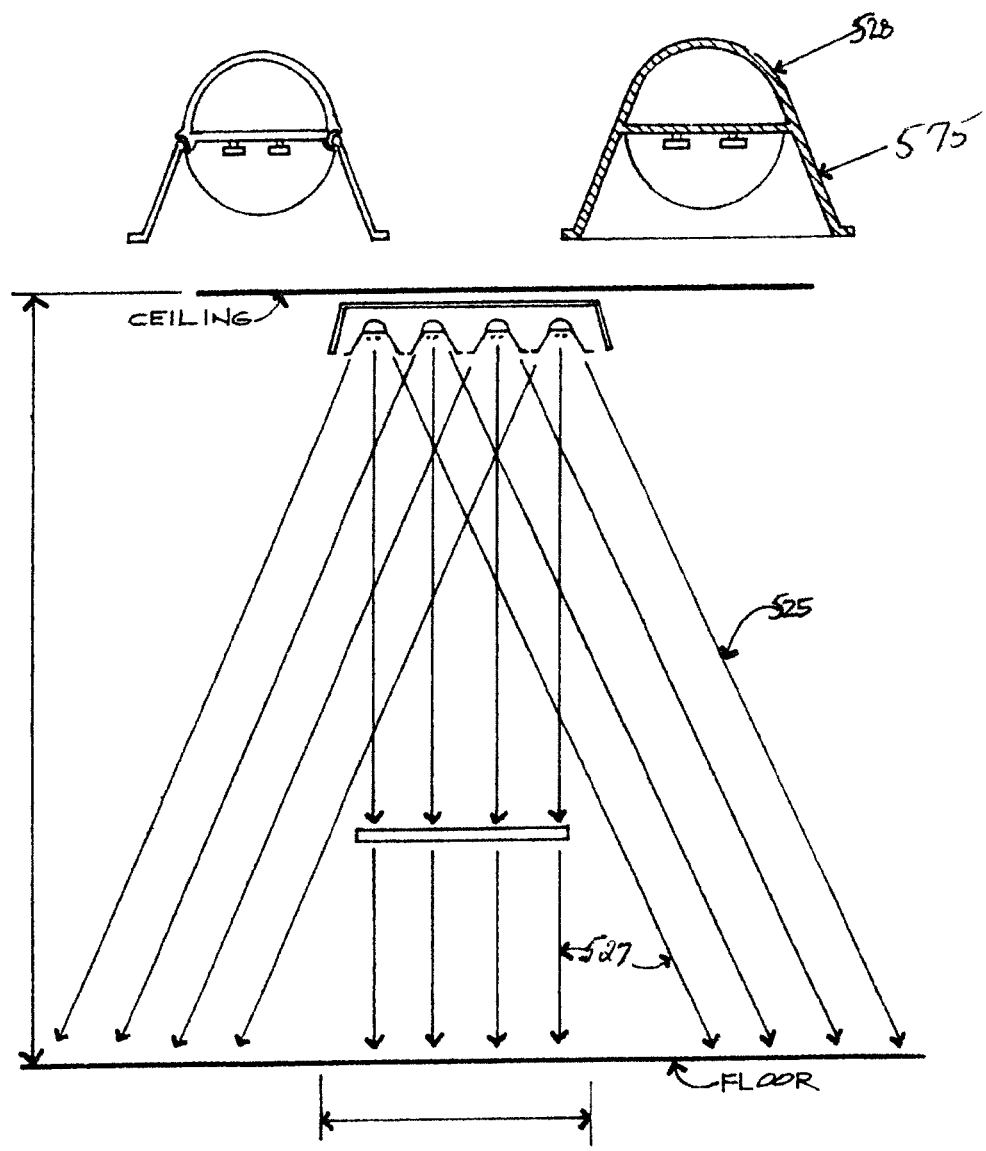
FIG. 50 illustrates the improved lighting distribution as provided by a troffer in accordance with the present invention, as provided in FIG. 48 for example.
Figure 51:
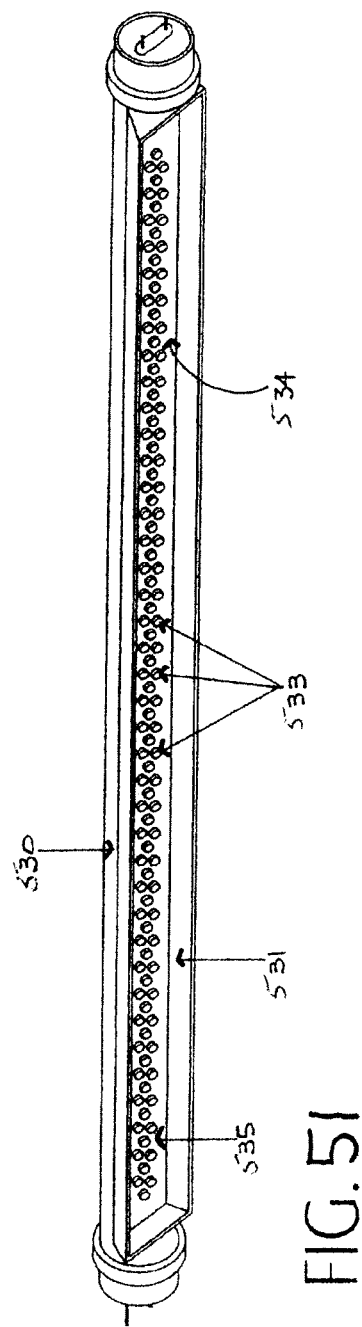
FIG. 51 illustrates a perspective view of one embodiment of a bulbless light assembly containing angled deflectors built therein.
Figure 60:
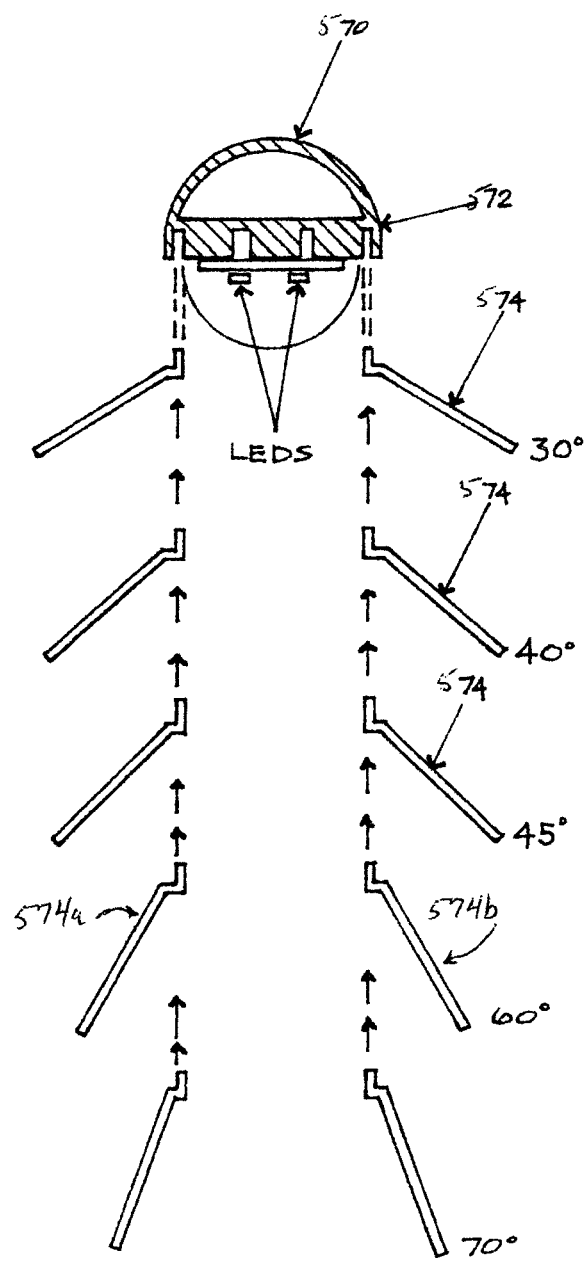
FIG. 60 illustrates various angles that may be optionally provided by snap-fit deflectors of various angular form, to vary the angular displacement between a vertical plane bisecting the LED tube or light assembly and the deflector panels.

In accordance with this aspect of the invention, a light deflector attached to a lighting assembly formed in accordance with any aspect of the present invention is provided. As shown in FIGS. 60 and 61 in particular, and more generally in FIGS. 34*d* through 34*i*, 37, 38, 39*a* through 39*d*, FIG. 48, and FIGS. 50-61, a light deflector 575 may be substantially coextensive with the length of the removable light assembly 570, and may comprise a first deflector panel or attachment member 574*a* and a second deflector panel or attachment member 574*b*. A first attachment member 574*a* may be formed along a first bottom edge of the removable light assembly housing 553*a* and extend for the length thereof. A second attachment member 574*b* may be formed along a second bottom edge of the removable light assembly 570 and may extend for the length thereof. A first attachment groove 553*b* and a second attachment groove 553*d* may be formed along a first edge and a second edge of the housing 553*a* of the removable lighting assembly 570, thereby providing two female grooves for receipt of the corresponding first and second attachment members. The first and second attachment members may therefore be slidably received by the first and second grooves respectively. As shown in FIG. 57, an angular displacement 555 is defined between a vertical plane orthogonally extending from a portion 559 of the deflector 552. Each of the first and second deflector panels 574 may be firmly fixed and defined upon installation of the first and second panels 574*a* and 574*b* within the first and second grooves 553*b* and 553*d*, respectively. If desired, a first and second hinge member (not shown) corresponding to the first and second deflector panel may be provided thereby providing an adjustable angular displacement of each panel from the vertical plane intersecting the light assembly to divide the light assembly into two equal parts. The deflector 552 may be preferably formed from lightweight and reflective material such as aluminum. As described below, light assemblies, troffers, and/or embodiments containing a deflector as shown in FIGS. 46-61 may be otherwise formed as described with regard to FIGS. 1-45. A light bulb 570 as shown in FIGS. 46-61, for example may be characterized (as shown in FIG. 51 for example) as a removable light assembly 570 containing a housing 530; a solid state lighting unit 534 contained within the housing 530 wherein the solid state lighting may be a fluorescent or LED type electronically communicating with the housing 530, or any other solid state lighting; and a deflector 531 fixed or removably fixed about the solid state lighting unit as explained herein.

Figure 46:
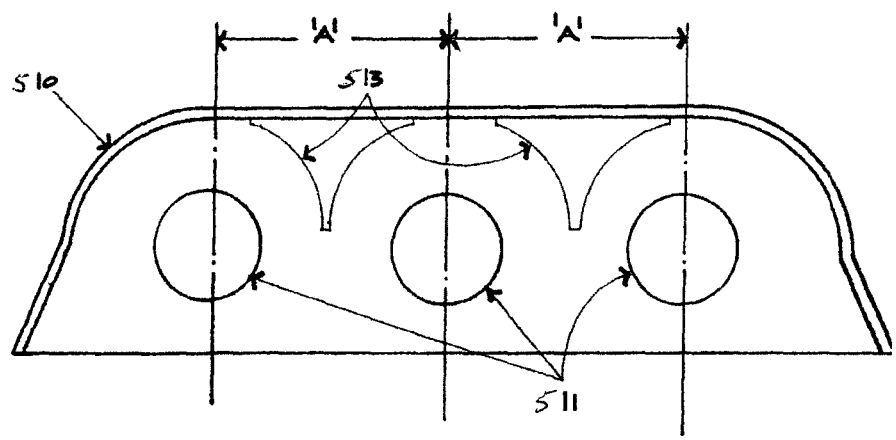
FIG. 46 illustrates a known fluorescent troffer design containing fluorescent tube lighting.
Figure 47:
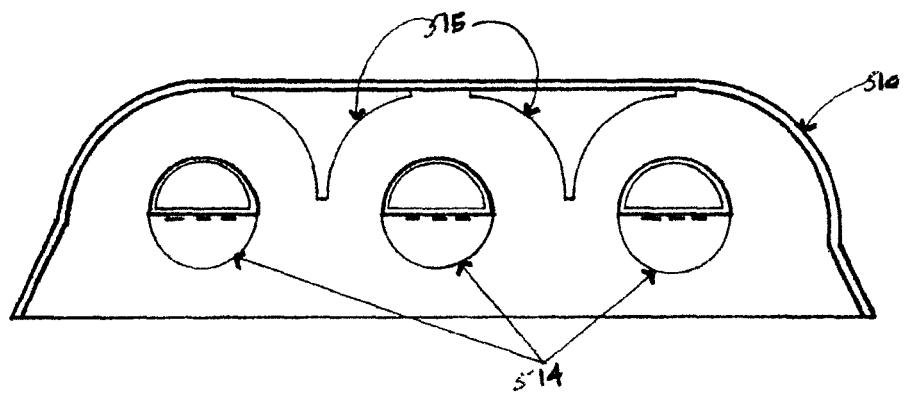
FIG. 47 illustrates a known troffer design containing LED tubes.
Figure 48:
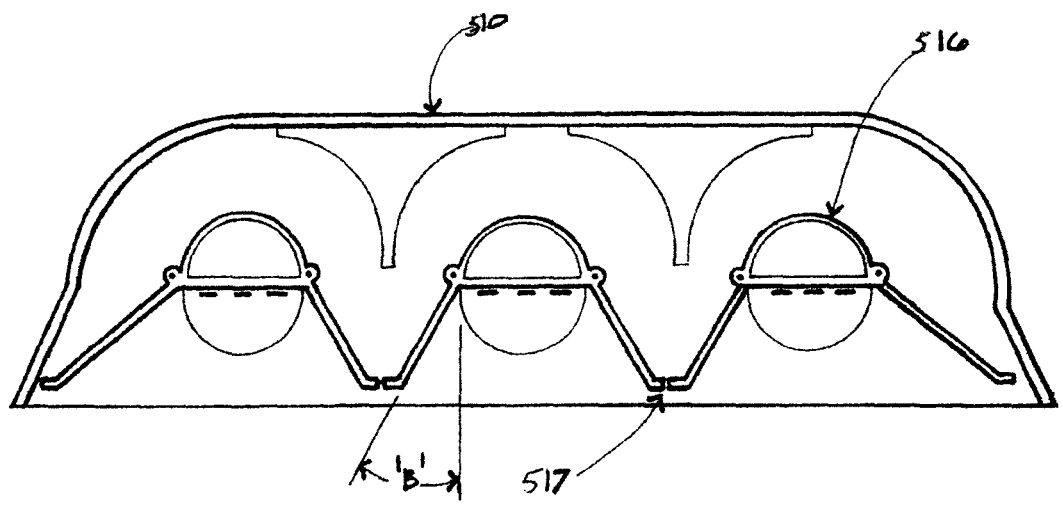
FIG. 48 illustrates a troffer containing LED tubes, wherein the troffer further contains reflectors/deflectors angled outwardly from the LED tubes in accordance with the present invention.

As shown in FIGS. 46-49, a troffer or light fixture 510 may contain one or more removable lighting assemblies 516, 518 (or solid state light bulbs) in a conventional manner, such as by pin and socket connection, for example. Deflector members 513 may be fixed to an inner wall, or to an inner upper wall 510*a* of the troffer 510. FIG. 46 illustrates two pairs of curved members 513 forming each deflector member 513. FIGS. 47 and 48 illustrate deflective blocks 515 being attached to an inner wall, or to an inner upper wall 510*a* of the troffer 510. The deflective members 513 or deflective blocks 515 may generally be known as a deflector and may be attached by tongue and groove methods for example, by adhesive methods, by metal screws, or by other attachment means suitable for this purpose. FIG. 48 illustrates a lighting fixture that combines the deflective block technology along with the use of deflective attachment members 574 as explained with regard to FIGS. 60-61, for example. It will be appreciated that the deflective members 513 and deflective blocks 515 are designed to cooperate with the inner wall 510*a*, whereby the light is routed about the surface of the inner wall and downward toward a working surface such as a table or a floor.

Figure 49:
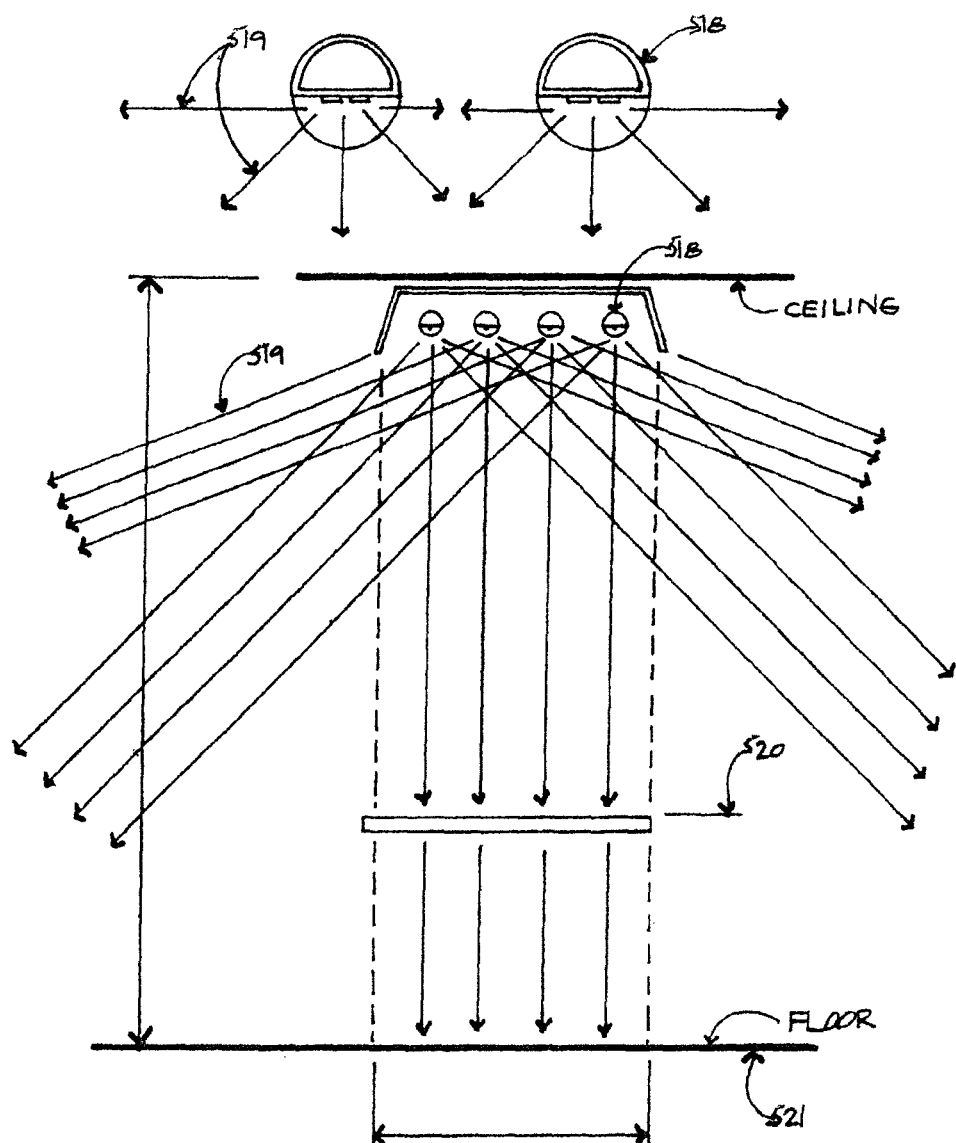
FIG. 49 illustrates the lighting distribution as provided by a troffer made in accordance with FIG. 47 for example.

FIG. 49 illustrates the typical lighting patterns 519 expected from state of the art lighting assemblies containing fluorescent, LED technology, or other solid state lighting units, each schematically represented in FIG. 49. As shown in FIG. 49, much of the light escapes to areas that are less desirable. Note that a table 520 has a fraction of the resultant lighting reaching its surface. In the same way, note that a floor 521 also has a fraction of the resultant lighting reaching its surface. In contrast, FIG. 50 illustrates how the use of attachment members and deflectors about the lighting assemblies functions to focus the lighting in a more efficient manner about the table and within a smaller area on the floor. As a result, more efficient lighting can be achieved merely by deflecting the light at the point of origin, that is at the lighting assembly.

FIGS. 51-54 illustrate the light deflection technology in several embodiments. As shown in these FIGURES, a light deflector 524, 531, 541 may be integrally formed within a housing 530 as shown. FIG. 55 shows a side, cross-sectional view of the embodiment of FIG. 54, whereby the lighting assembly shown may operate in any manner as described herein.

In yet another embodiment as shown in FIGS. 56 and 58, the deflector or deflector panel may also be attached to each light assembly by one or more straps 550, each strap 550 saddling, draping, or extending over a top portion of the light assembly. A first end of a first saddle or strap 550 is connected to the first deflector 557, and a second end of the saddle or strap is connected to the second deflector 561. As shown in FIGS. 60-61, the angular displacement of the attachment members 574 (also illustrated in FIG. 48 as "B"), may be varied by providing snap fit deflector assemblies with varying angular displacement that may be interchanged depending on the intensity of light desired at floor level for example. Alternatively, the straps 560 may be lengthened or shortened to define a greater angular displacement from the vertical plane "A" extending through the light assembly. It will be appreciated that if more straps are employed, then each of the straps are preferably of an equal or substantially equivalent length thereby defining an equal or substantially equivalent angular displacement of the deflectors across the length of the light assembly.

In yet another embodiment (not shown), the deflector panel may extend from an attachment means from the inner roof of the troffer light fixture, mating Velcro straps for example, that orient the deflector panels about the LED lighting assemblies as shown in FIGS. 34*d* through 34*i*, 37, 38, and 39*a* through 39*d*, again with equivalent angular displacements from the vertical plane "A" across the length of the LED lighting assembly. If desired, hinge members (not shown) may be provided on each of the first and second deflector panels, that may or may not extend across the length of each deflector panel. Accordingly, the angular displacement defined by the deflector panel with regard to vertical plane "A" may be adjusted in this manner. Each deflector panel is preferably adjusted to have substantially the same angular displacement as described herein.

With reference to FIGS. 60 and 61, it will be appreciated that by tailoring the angular displacement or arcuate length of the deflector panels or attachment members 574 of the deflector or shroud 575, the light may be focused more intensely to underlying areas as desired. As a result, more efficient use of the LED lighting is facilitated, thereby reducing the overall energy required to provide adequate lighting, as compared to state of the art LED tubes, for example.

In yet another aspect of the invention, and as shown in FIGS. 52, 56, 58, and 61, for example, the light deflectors 575 of the present invention may be formed with apertures, vents, or open areas 551 that facilitate the release or venting of heat from about the housing 553 for example. Stated another way, the present invention may employ light deflectors 575 that include one or more vents 551 along the length of the deflector 575. As such, each attachment member 574 may be formed with one or more vents 551, or, each deflector 575 as a whole may be formed with one or more vents 551.

Figure 52:
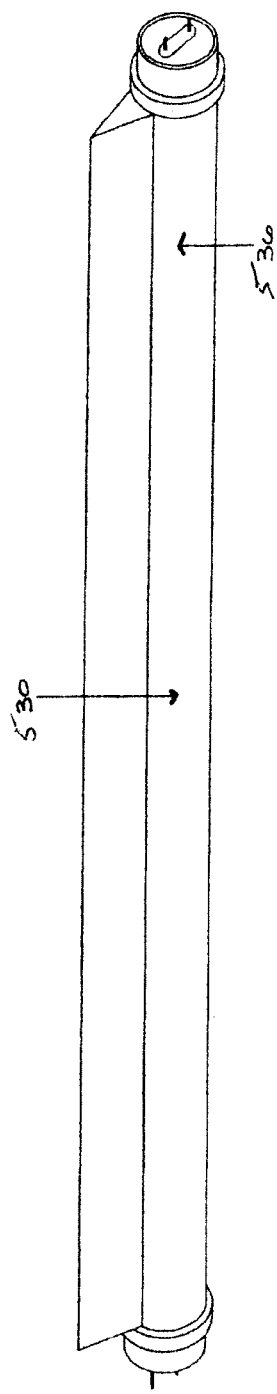
FIG. 52 illustrates a perspective view of the back of the embodiment of FIG. 51.
Figure 53:
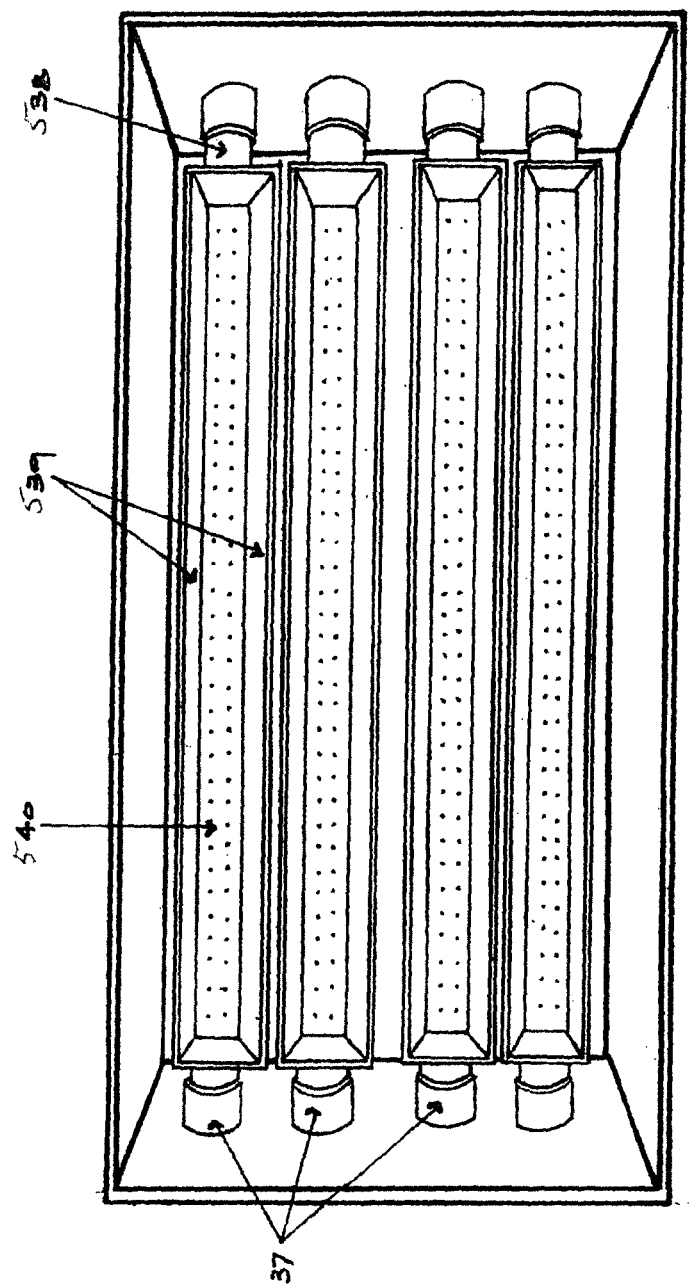
FIG. 53 illustrates a troffer containing light assemblies as provided in FIGS. 51 and 52.

In FIG. 52, a deflector 531 is formed about the removable light assembly 530. As also shown, a plurality of vents or apertures 551 are integrally formed within the deflector 531, thereby providing positions along the deflector 531 that facilitate the release of heat from about the lighting assembly. As a result, the serviceability and the maintenance requirements are optimized thereby resulting in longer life of the light assembly 530. In another embodiment shown in FIG. 56, the deflector 552 may be integrally formed with a plurality of apertures/vents 551 interspersed across the length of the deflector 552, for release of heat therefrom. The same vents 551 may be formed in attachment members 574 as shown in FIG. 61, for example.

As also shown in FIG. 56, a plurality of saddles 550 are formed across the length, including at a first end and a second end of the lighting assembly 553, whereby the saddles 550 are draped over the removable lighting assembly 553 thereby supporting the deflector 552. FIG. 57 illustrates the interface between a groove 553b on the housing 553a, and a lip 553c on the deflector 552, whereby the deflector 552 is thus removably fixed about the lighting assembly 553 by sliding the lip 553c of each attachment member or deflector portion 574 within the groove 553b of each housing 553a. FIG. 57 also illustrates the vents 551 formed within the deflector 552, whereby the deflector 552 or integral attachment member 552 contains a first groove 553b and a second groove 553d, for receipt of a first lip 553c and a second lip 553e in slidable engagement with each respective groove 553b and 553d.

FIG. 58 illustrates an exploded view of yet another embodiment of a vented deflector 552, in accordance with the present invention. FIG. 59 is a cross-sectional view of the embodiment of FIG. 58 when assembled and illustrates the angular deflector 552 as fixed about the lighting assembly, again illustrating one or more vents 551 formed within the deflector 552.

FIG. 60 illustrates various deflectors 575 containing at least two attachment members 574 snap fit or otherwise attached to a lighting assembly 570. As shown, a plurality of interchangeable attachment members 574 may be formed to result in distinctive angular displacements as each is interchangeably fixed about the removable lighting assembly 570. As with FIG. 57, the embodiments shown in FIG. 60 may also be removably fixed to the lighting assembly 570. A lip 553c on each attachment member 574 may be snap fit, slidably engaged, or otherwise removably fixed with a corresponding groove 553b formed within the lighting assembly 570 thereby securing the attachment member 574 to the lighting assembly 570. It will be appreciated that the angular displacement resulting from a first attachment member 574a may differ from that of the opposite second attachment member 574b if desired, merely by selecting first and second attachment members 574a and 574b formed with distinctive angular displacement about the lighting assembly 570.

FIG. 61 illustrates various deflectors 575 containing at least two attachments members 574 snap fit or otherwise attached to a lighting assembly. As shown, a plurality of interchangeable members 574 may be formed to result in distinctive parabolic or rounded displacements as each is interchangeably fixed about the removable lighting assembly 570. As with FIGS. 57 and 60, the embodiments shown in FIG. 61 may also be removably fixed to the lighting assembly 570. A lip 553c on each attachment member 574 is snap fit, slidably engaged, or otherwise removably fixed within a corresponding groove 553b formed within the lighting assembly 570 thereby securing the attachment member 574 to the lighting assembly 570. It will be appreciated that the parabolic or other reflective displacement resulting from a first attachment member 574a may differ from that of the opposite second attachment member 574b if desired, merely by selecting first and second attachment members 574a and 574b formed with distinctive parabolic or arcuate lengths within the respective attachment members 574. It has been found that depending on the application, it may be desirable to further focus the lighting emanating from the lighting assembly 570 through the use of a parabolic or arcuate deflector as shown. The ability to focus the light as shown in FIG. 50 may be tailored depending on the type of deflector technology used, such as that shown in FIGS. 51-55, and 60-61 for example.

It will be understood that the foregoing descriptions of embodiments of the present invention are for illustrative purposes only and should not be construed as limiting the scope of the invention. As such, the various structural and operational features herein disclosed are susceptible to a number of modifications commensurate with the abilities of one of ordinary skill in the art, none of which departs from the various permutations described herein.

What is claimed is:

1. A removable light assembly comprising:
   a housing;
   a solid state lighting unit contained within the housing and electronically communicating therewith;
   an adjustable deflector fixed about at least a portion of the solid state lighting unit for focusing light emanating from the solid state lighting unit;
   a first longitudinal groove and a second longitudinal groove formed within said housing;
   a first attachment member and a second attachment member forming said deflector;
   a first longitudinal lip formed within said first attachment member; and
   a second longitudinal lip formed within said second attachment member,
   wherein said first longitudinal lip is removably fixed within said first longitudinal groove, and said second longitudinal lip is removably fixed within said second longitudinal groove whereby the attachment members and the angular displacement of the first and second attachment members may be adjusted by selectively providing interchangeable attachment members with alternative angular displacement depending on the intensity of light desired.

2. The light assembly of claim 1 wherein said solid state lighting unit is selected from fluorescent bulbs or light emitting diode assemblies.

3. The light assembly of claim 1 wherein said first attachment member and said second attachment member each define an angular displacement from said solid state lighting unit.

4. The light assembly of claim 1 wherein said first attachment member and said second attachment member each define an arcuate length for reflection of light.

5. The light assembly of claim 3 wherein said first attachment member and said second attachment member each define a different angular displacement from said solid state lighting unit.

6. The light assembly of claim 4 wherein said first attachment member and said second attachment member each define a different arcuate length.

7. The light assembly of claim 1 wherein said deflector contains one or more vents for release of heat therefrom.

8. The light assembly of claim 1 wherein said deflector is removably fixed about said solid state lighting unit.

9. A removable light assembly comprising:
a housing;
a solid state lighting unit contained within the housing and electronically communicating therewith;
one or more straps hanging over said solid state lighting unit, each of said straps having a first end and a second end;
a first deflector connected to the first end of each of said one or more straps; and
a second deflector connected to the second end of each of said one or more straps,
wherein said one or more straps secure said first and second deflectors about said solid state lighting unit to thereby define open areas about said solid state lighting unit.

10. The removable light assembly of claim 9 wherein each of said deflectors has a unique angle of displacement depending on a desired angle of deflection of light.

11. The removable light assembly of claim 9 wherein said deflectors may be selectively and removably fixed to said portion of the solid state lighting unit depending on the desired amount of angular displacement of each of said deflectors when removably fixed to said solid state lighting unit.

\* \* \* \* \*